United States Patent
Otsuka

(10) Patent No.: US 11,635,309 B2
(45) Date of Patent: Apr. 25, 2023

(54) SEMICONDUCTOR DEVICE AND CAPACITANCE SENSOR CIRCUIT

(71) Applicant: LAPIS Technology Co., Ltd., Yokohama (JP)

(72) Inventor: Masayuki Otsuka, Yokohama (JP)

(73) Assignee: LAPIS TECHNOLOGY CO., LTD., Yokohama (JP)

( * ) Notice: Subject to any disclaimer, the term of this patent is extended or adjusted under 35 U.S.C. 154(b) by 0 days.

(21) Appl. No.: 17/665,460

(22) Filed: Feb. 4, 2022

(65) Prior Publication Data

US 2022/0252433 A1 Aug. 11, 2022

(30) Foreign Application Priority Data

Feb. 5, 2021 (JP) .............................. JP2021-017559

(51) Int. Cl.
*G01D 5/24* (2006.01)
*G01K 7/34* (2006.01)

(52) U.S. Cl.
CPC ............... *G01D 5/24* (2013.01); *G01K 7/343* (2013.01)

(58) Field of Classification Search
CPC .. G01D 5/00; G01D 5/12; G01D 5/14; G01D 5/24; G01K 7/00; G01K 7/34; G01K 7/343; G01K 3/00; G01K 3/02; G01K 3/04; G01K 1/00; G01K 1/02; G01K 1/024; G11C 16/00; G11C 16/02; G11C 16/06; G11C 16/30; G11C 16/34

USPC .......................................... 324/500, 537, 548
See application file for complete search history.

(56) References Cited

U.S. PATENT DOCUMENTS

| | | | | |
|---|---|---|---|---|
| 2003/0071641 A1* | 4/2003 | Armbruster | ........ | G01R 31/2853 324/687 |
| 2013/0169455 A1* | 7/2013 | Helio | ..................... | G04F 10/105 341/120 |
| 2019/0072590 A1* | 3/2019 | Kim | ..................... | G01R 19/257 |

FOREIGN PATENT DOCUMENTS

| CN | 106643825 A | * | 5/2017 | ............... G01D 5/24 |
| JP | 3671866 B2 | * | 7/2005 | ............. G11C 11/22 |
| JP | 2005322324 A | * | 11/2005 | ............. G11C 29/00 |
| JP | 2007-333484 A | | 12/2007 | |

* cited by examiner

*Primary Examiner* — Hoai-An D. Nguyen
(74) *Attorney, Agent, or Firm* — Rabin & Berdo, P.C.

(57) ABSTRACT

A semiconductor device comprises a control unit, a semiconductor memory, a reference capacitance unit, a determination capacitance unit, a calibration circuit configured to supply a selection signal to the reference capacitance unit to selectively connect capacitors to differing potentials, and a determination circuit configured to charge a capacitance of the reference capacitance unit, to charge a capacitance of the determination capacitance unit, and to attain a comparison result by comparing the differing potentials. The control unit is configured to control rewriting of the semiconductor memory on the basis of a determination result of the determination circuit.

9 Claims, 12 Drawing Sheets

| TEST | OPT2 | CIN0M | CIN0M2 | CIN0P | CIN1P | CIN1T | CIN0T | ITEST2 | ITESTB2 | CIN0TP |
|---|---|---|---|---|---|---|---|---|---|---|
| L | L | Ground Potential | | Connection to CIN0 | Connection to CIN1 | Ground Potential | | | | |
| L | H | | Connection to CIN0 | Ground Potential | | Connection to CIN1 | Ground Potential | L | H | H |
| H | L | Ground Potential | | | | Connection to CIN1 | Connection to CIN0 | H | L | L |

FIG. 6

SEMICONDUCTOR DEVICE AND CAPACITANCE SENSOR CIRCUIT

CROSS REFERENCE TO RELATED APPLICATION

This application is based upon and claims the benefit of priority of the prior Japanese Patent Application No. 2021-017559, filed on Feb. 5, 2021, the entire contents of which are incorporated herein by reference.

TECHNICAL FIELD

The present invention relates to a capacitance sensor circuit that detects the capacitance of a capacitor, and a semiconductor that includes the capacitance sensor circuit.

BACKGROUND ART

An IC tag provided with a function of detecting a history of change in ambient temperature to which an article is exposed while the article is being transported or stored and wirelessly transmitted the detected information has been proposed (e.g., Japanese Patent Application Laid-Open Publication No. 2007-333484).

The IC tag uses, as a sensor that detects a change in ambient temperature, a capacitor formed by filling the space between electrodes with a mass of wax as a dielectric, and an absorption section that absorbs liquid wax if the mass of wax liquefies. That is, in the capacitor, if the ambient temperature rises enough to reach the melting point of wax, the wax that had filled the space between the electrodes of the capacitor liquefies and is absorbed by the absorption section. As a result, air fills the area of the capacitor between the electrodes. The permittivity of air is less than the permittivity of wax, and thus, the capacitance of the capacitor decreases and the impedance increases.

The IC tag is provided with a circuit that detects the impedance as the capacitance of the capacitor, and wirelessly transmits data indicating the detection results.

The data wirelessly transmitted from the IC tag is received by a prescribed reception device. The reception device compares, to a prescribed threshold, the received detection results, that is, the impedance of the capacitor, to determine whether or not the wax has melted. If it is determined that the wax has melted, it is confirmed that the capacitor has, at some point before the present time, been exposed to a high ambient temperature that exceeds the melting point of the wax.

SUMMARY OF THE INVENTION

The IC chip constituting such an IC tag is provided with a non-volatile memory for storing detection results for the capacitance of capacitors and the identification ID of the IC chip. In order to efficiently rewrite data to the non-volatile memory, it is preferable that the rewrite voltage be controlled according to the capacitance determined by the film thickness of the gate insulating film constituting the memory (hereinafter referred to as the capacitance of the film thickness of the non-volatile memory). However, such an IC tag has the function of measuring the capacitance of the capacitor but does not allow for calculation of the capacitance value of the film thickness of the non-volatile memory for storing the measurement results. This has presented the problem that the rewrite voltage of the non-volatile memory could not be suitably controlled.

The present invention takes into account the above-mentioned problem, and an object thereof is to provide a semiconductor device by which it is possible to control the rewrite voltage of the non-volatile memory according to the capacitance of the film thickness of the non-volatile memory.

A semiconductor device according to the present invention includes: a semiconductor memory constituted of a capacitance element; a control unit that is configured to control a rewrite voltage for the semiconductor memory; a reference capacitance unit including a plurality of capacitors, each of which has a reference capacitance, and each of which is connected between a first line and a line of a prescribed potential via a switch element; a determination capacitance unit, one end of which is connected to a second line and another end of which is grounded, the determination capacitance unit being constituted of a capacitance element having a same structure as the capacitance element constituting the semiconductor memory; a calibration circuit that is configured to supply, to the reference capacitance unit, a selection signal that is configured to selectively connect, on the basis of a signal level thereof, any of the plurality of capacitors to between the first line and the line of the prescribed potential by controlling the switch element connected to each of the plurality of capacitors to be ON or OFF; and a determination circuit that is configured to charge a capacitance of the reference capacitance unit by transmitting a charge current to the first line, to charge a capacitance of the determination capacitance unit by transmitting a charge current to the second line, and to attain a comparison result by comparing a potential of the first line to a potential of the second line, wherein the control unit is configured to control rewriting of the semiconductor memory on the basis of a determination result of the determination circuit.

Also, a capacitance sensor circuit according to the present invention is formed on a same chip as a semiconductor memory constituted of a capacitance element, and detects a capacitance of the capacitance element, the capacitance sensor circuit including: a reference capacitance unit including a plurality of capacitors, each of which has a reference capacitance, and each of which is connected between a first line and a line of a prescribed potential via a switch element; a determination capacitance unit, one end of which is connected to a second line and another end of which is grounded, the determination capacitance unit being constituted of a capacitance element having a same structure as the capacitance element constituting the semiconductor memory; a calibration circuit that is configured to supply, to the reference capacitance unit, a selection signal that is configured to selectively connect, on the basis of a signal level thereof, any of the plurality of capacitors to between the first line and the line of the prescribed potential by controlling the switch element connected to each of the plurality of capacitors to be ON or OFF; and a determination circuit that is configured to charge a capacitance of the reference capacitance unit by transmitting a charge current to the first line, to charge a capacitance of the determination capacitance unit by transmitting a charge current to the second line, and to attain a comparison result by comparing a potential of the first line to a potential of the second line.

Thus, according to the semiconductor device of the present embodiment, it is possible to suitably control the rewrite voltage of the semiconductor memory according to the capacitance determined by the film thickness of the gate insulating film constituting the semiconductor memory.

BRIEF DESCRIPTION OF THE DRAWINGS

FIG. 6 shows the correspondence relationship between the signal levels of a test mode signal and a switching signal and the connective states of terminals.

DETAILED DESCRIPTION OF EMBODIMENTS

Figure 1:
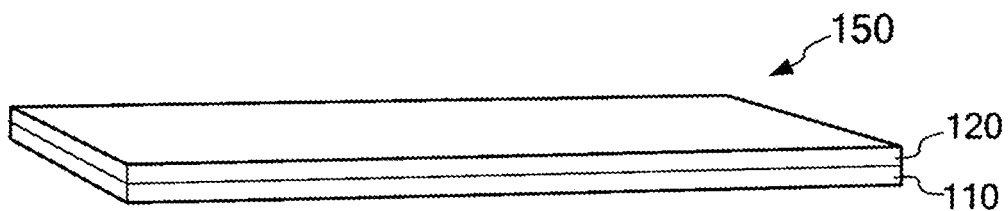
FIG. 1 is a perspective view showing an external appearance of a sensor tag 150 including a capacitance sensor device.

Suitable embodiments of the present invention will be explained below in detail. In the description of embodiments and the affixed drawings below, parts that are substantially the same or equivalent to each other are assigned the same reference characters.

Embodiment 1

FIG. 1 is a perspective view showing an external appearance of a sensor tag 150 including a capacitance sensor device according to the present invention. The sensor tag 150 is a passive RFID (radio-frequency identification) IC tag provided with the function of detecting whether or not the sensor tag has been exposed to an ambient temperature higher than a prescribed temperature, and wirelessly transmitting the detection results.

The sensor tag 150 includes a substrate 110 having formed on one surface thereof a plurality of devices, and a protective plate 120 that is adhered to the one surface of the substrate 110 so as to cover the plurality of devices. The substrate 110 and the protective plate 120 are flexible substrates made of polyethylene terephthalate (PET) or the like, for example.

Figure 2:
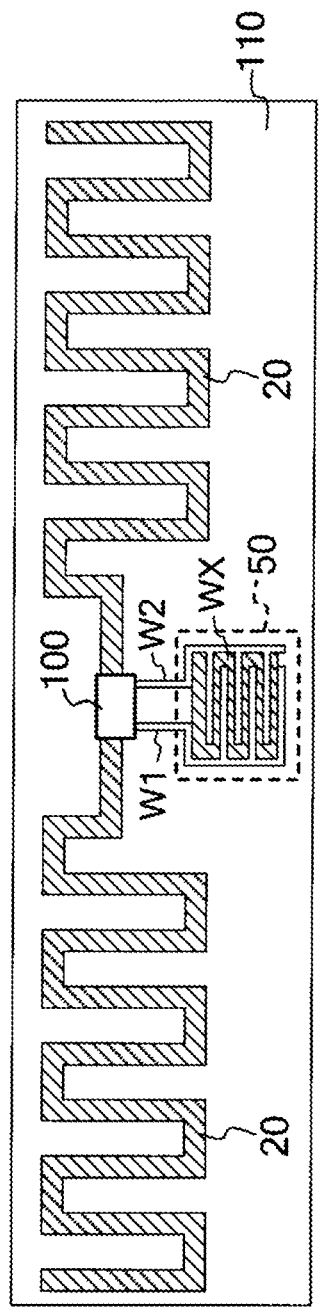
FIG. 2 is a plan view showing a top view of a device formed on a substrate surface of the sensor tag.

FIG. 2 is a plan view showing a top view, through the protective plate 120, of devices formed on the surface of the substrate 110 (the surface on which the protective plate 120 has been adhered).

On the one surface of the substrate 110 are formed devices such as an IC (integrated circuit) chip 100, antennas 20, and a sensor capacitor 50.

The antennas 20 are made of a conductive wiring material, and are connected to electrode pads of the IC chip 100 as a semiconductor device.

The sensor capacitor 50 functions as a temperature sensor having a structure by which the capacitance thereof irreversibly changes due to the surrounding temperature and a change in ambient temperature is detected on the basis of the change in capacitance.

As shown in FIG. 2, the sensor capacitor 50 includes interdigital electrodes W1 and W2 that are disposed on and along the one surface of the substrate 110, and wax WX that fills the area between the teeth of the electrodes W1 and W2. The electrodes W1 and W2 are electrodes having an interdigital plan view pattern in which the teeth of the respective electrodes are alternately disposed. The wax WX functions as the dielectric of the capacitor. The wax WX remains a solid when the ambient temperature is at or below a prescribed melting point, and liquefies when the ambient temperature exceeds the melting point. As a result, when the sensor capacitor 50 is exposed to a higher ambient temperature than the melting point, the wax WX functioning as the dielectric liquefies and flows out from between the electrodes W1 and W2, resulting in a decrease in capacitance of the sensor capacitor 50.

Thus, the sensor capacitor 50 functioning as a temperature sensor has a prescribed first capacitance if the ambient temperature is at or below a prescribed temperature (melting point of wax), the capacitance changing to a second capacitance lower than the first capacitance if the ambient temperature exceeds the prescribed temperature. The wax WX that is liquefied and flows out is absorbed by an absorbent body (not shown) made of paper or the like. As a result, even if the ambient temperature were to return to the melting point of wax WX or lower, the wax WX that has flowed out does not return, and thus, the sensor capacitor 50 remains at the second capacitance. The change in capacitance of the sensor capacitor 50 resulting from the liquefaction of the wax WX is irreversible.

The respective ends of the electrodes W1 and W2 of the sensor capacitor 50 are connected to electrode pads that are external terminals of the IC chip 100.

Figure 3:
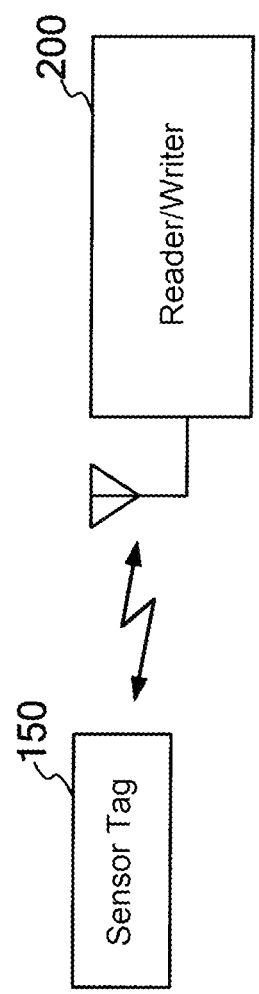
FIG. 3 shows an aspect in which wireless communication is performed between the sensor tag and a reader/writer.

FIG. 3 schematic shows a state in which wireless communication is performed between the sensor tag 150 and a reader/writer 200. The IC chip 100 included in the sensor tag 150 has formed therein a circuit that detects the capacitance of the sensor capacitor 50 and wirelessly transmits various information based on the capacitance and an identification ID to the reader/writer 200. The various information based on the capacitance of the sensor capacitor 50 includes information indicating whether the IC chip 100 has been exposed to an ambient temperature higher than a prescribed temperature, information indicating the capacitance, or the like.

Figure 4:
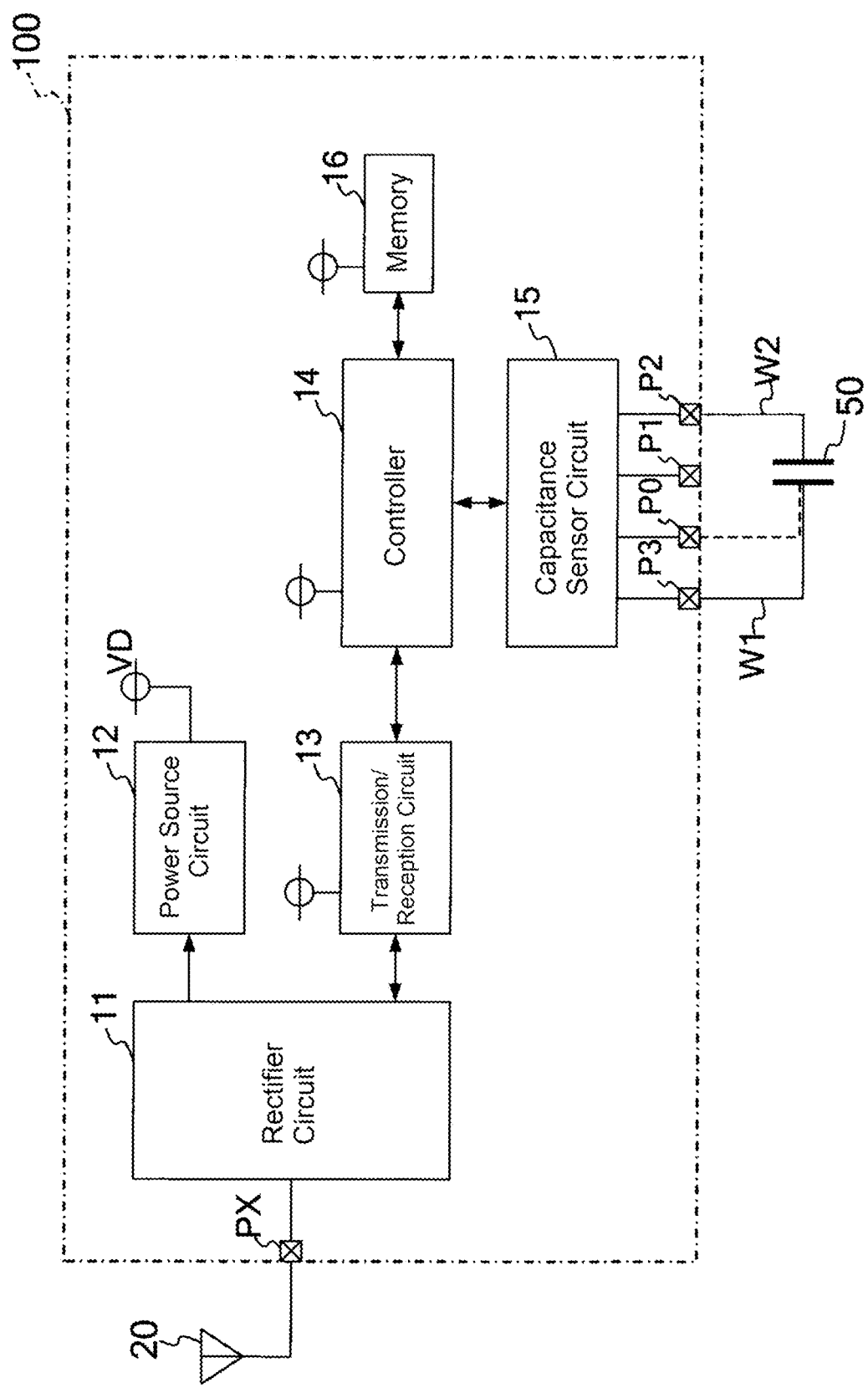
FIG. 4 is a block diagram showing a configuration of a circuit formed in an IC chip.

FIG. 4 is a block diagram showing a configuration of a circuit formed in the IC chip 100. The IC chip 100 has formed therein a rectifier circuit 11, a power source circuit 12, a transmission/reception circuit 13, a controller 14, a non-volatile memory 16 that stores the identification ID of the IC chip, and a capacitance sensor circuit 15.

The rectifier circuit 11 is connected to the antenna 20 via an electrode pad PX. The antenna 20 supplies to the rectifier circuit 11, via the electrode pad PX, a high frequency signal representing received information (including command codes) acquired by receiving a radio wave from the reader/writer 200 and a high frequency current for wireless supply of power.

The rectifier circuit 11 supplies a direct current voltage, attained by rectifying the high frequency current, to the power source circuit 12, and supplies, to the transmission/reception circuit 13, a signal attained by rectifying and detecting the high frequency signal as a reception signal.

Also, the rectifier circuit 11 supplies to the antenna 20 a modulation signal supplied from the transmission/reception circuit 13.

The power source circuit 12 generates a power source voltage VD with a constant voltage on the basis of the direct current voltage supplied from the rectifier circuit 11, and supplies the power source voltage to the transmission/reception circuit 13, the controller 14, the memory 16, and the capacitance sensor circuit 15. The supplied power source voltage VD serves as an operation power source for the transmission/reception circuit 13, the controller 14, the memory 16, and the capacitance sensor circuit 15, respectively.

The transmission/reception circuit 13 acquires a command code by demodulating the reception signal supplied from the rectifier circuit 11 and supplies the command code to the controller 14. Also, the transmission/reception circuit 13 supplies, to the rectifier circuit 11, a modulation signal attained by modulating, using the transmission information supplied from the controller 14, a carrier wave signal compatible with a UHF band used for near-distance wireless communication, an HF (high frequency) band, or an LF (low frequency) band.

The controller 14 reads in and acquires the identification ID stored in the memory 16. Also, the controller 14 supplies, to the capacitance sensor circuit 15, various control signals for causing the capacitance of the sensor capacitor 50 connected externally to the IC chip 100 to be detected.

The capacitance sensor circuit 15 compares the capacitance of the sensor capacitor 50 to a reference capacitance according to the various control signals. On the basis of the comparison result, the capacitance sensor circuit 15 determines whether the capacitance of the sensor capacitor 50 has changed from the first capacitance to the second capacitance that is lower than the first capacitance. The capacitance sensor circuit 15 supplies the determination results to the controller 14.

The controller 14 generates temperature change information indicating whether or not the sensor tag 150 has been exposed to an ambient temperature higher than the prescribed temperature on the basis of the determination results supplied from the capacitance sensor circuit 15. The controller 14 then supplies, to the transmission/reception circuit 13, the information including the generated temperature change information and the identification ID thereof as transmission information.

Also, the controller 14 controls a rewrite voltage (write voltage and delete voltage) to the memory 16 on the basis of the result of the capacitance determination operation, to be described later, that is executed by the capacitance sensor circuit 15.

The transmission/reception circuit 13 wirelessly transmits to the reader/writer 200 the transmission information including the temperature change information and the identification ID. As a result, information indicating whether or not the sensor tag 150 has been exposed to an ambient temperature higher than the prescribed temperature is supplied to the reader/writer 200.

The memory 16 is a non-volatile semiconductor memory that, in the present embodiment, includes a capacitor constituted of NMOS transistors (NMOS capacitors). The memory 16 stores the identification ID of the sensor tag 15 and the value of the trimming signal indicating calibration results of the capacitance sensor circuit 15.

Next, the capacitance sensor circuit 15 will be explained. The capacitance sensor circuit 15 is connected to electrode pads P0 to P3 that are external terminals of the IC chip 100.

The electrode pads P0 to P3 are so-called bonding pads, all of which have the same parasitic capacitance value.

Among the electrode pads P0 to P3, P0 and P3 are electrode pads for external connection of the electrode W1, which is one of the electrodes W1 and W2 of the sensor capacitor 50. The electrode pad P2 is an electrode pad for external connection of the electrode W2, which is the other of the electrodes W1 and W2 of the sensor capacitor 50.

The electrode pad P0 is an electrode pad for connecting the electrode W1 of the sensor capacitor 50 if the capacitance of the sensor capacitor 50 is relatively low. On the other hand, the electrode pad P3 is an electrode pad for connecting the electrode W1 of the sensor capacitor 50, if the capacitance of the sensor capacitor 50 is relatively high.

Figure 5:
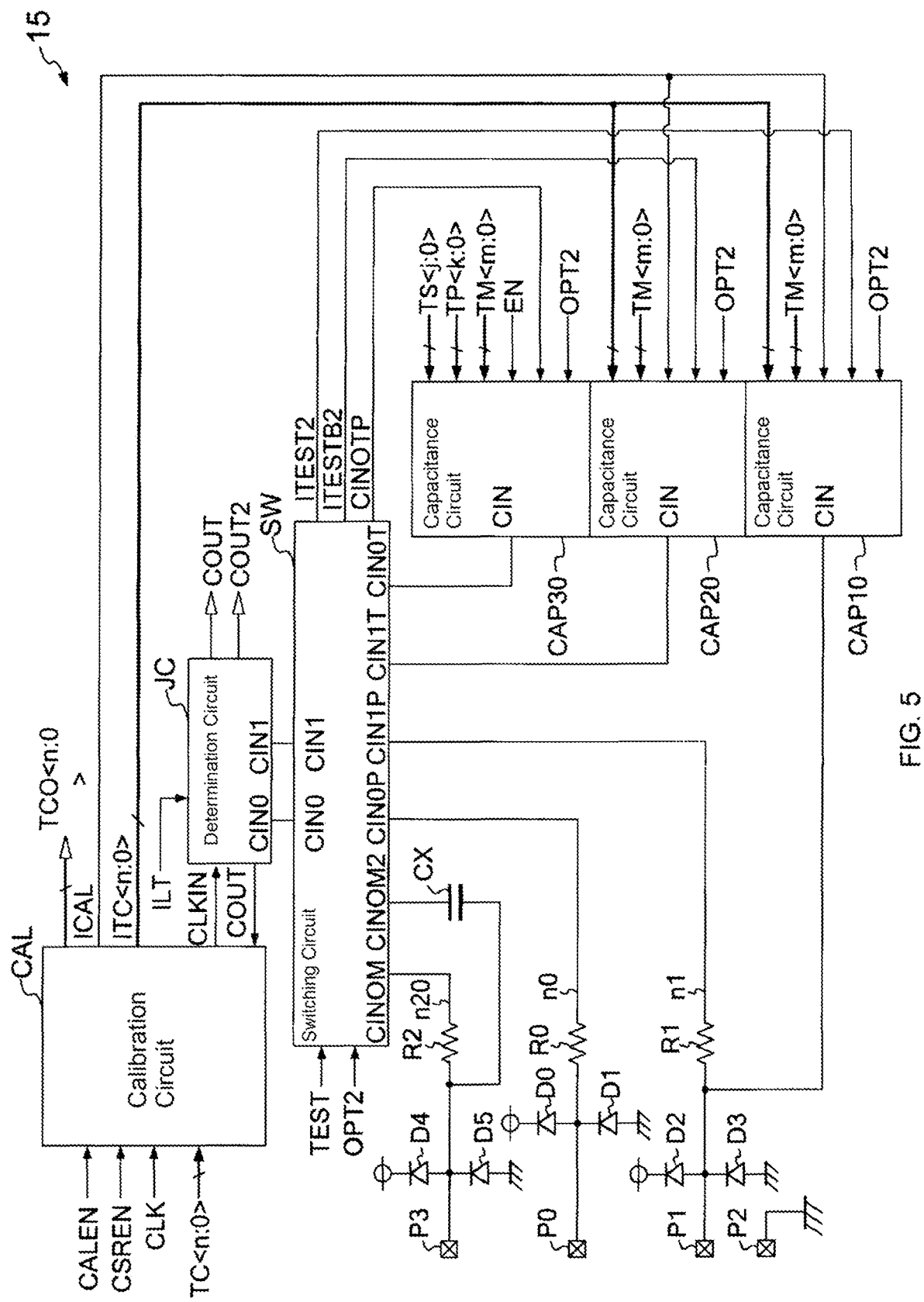
FIG. 5 is a block diagram showing a configuration of a capacitance sensor circuit.

FIG. 5 is a block diagram showing the configuration of the capacitance sensor circuit 15.

The capacitance sensor circuit 15 includes diodes D0 to D5, resistors R0 to R2, a calibration circuit CAL, a determination circuit JC, a switching circuit SW, an additional capacitor CX, a first capacitance circuit CAP10, a second capacitance circuit CAP20, and a third capacitance circuit CAP30.

The anode of the diode D0, the cathode of the diode D1, and one end of the resistor R0 are connected to the electrode pad P0. The power source voltage is applied to the cathode of the diode D0, and the anode of the diode D1 is grounded. Another end of the resistor R0 is connected to an input terminal CIN0P of the switching circuit SW via the node n0.

The anode of the diode D2, the cathode of the diode D3, a capacitance connection terminal CIN of the first capacitance circuit CAP10, and one end of the resistor R1 are connected to the electrode pad P1. The power source voltage is applied to the cathode of the diode D2, and the anode of the diode D3 is grounded. Another end of the resistor R1 is connected to an input terminal CIN1P of the switching circuit SW via the node n1.

The electrode pad P2 is grounded. The anode of the diode D4, the cathode of the diode D5, one end of the resistor R2, and one end of the additional capacitor CX are connected to the electrode pad P3. The power source voltage is applied to the cathode of the diode D4, and the anode of the diode D5 is grounded. Another end of the resistor R2 is connected to an input terminal CIN0M of the switching circuit SW via the node n20. Another end of the additional capacitor CX is connected to an input terminal CIN0M2 of the switching circuit SW.

The diodes D0 to D5 all have the same parasitic capacitance for the cathodes thereof and for the anodes thereof. Also, the resistance is the same for all of the resistors R0 to R2.

The diodes D0 to D5 and the resistors R0 to R2 constitute a protection circuit that protects the internal circuit (SW, JC, CAL, CAP10, CAP20, CAP30) from static electricity entering via the electrode pads P0 to P3 from outside of the IC chip 100. Also, the resistors R0 to R2 and the parasitic capacitances of the nodes n0, n1, and n20 function as filters, thereby providing a high durability against noise entering via the electrode pads P0, P1, and P3 from outside of the IC chip 100.

The capacitance connection terminal CIN of the second capacitance circuit CAP20 is connected to the input terminal CIN1T of the switching circuit SW. The capacitance connection terminal CIN of the third capacitance circuit CAP30 is connected to the input terminal CIN0T of the switching circuit SW.

A test mode signal TEST is a signal having an H level when performing a test to determine, for the IC chip 100 alone, whether the detection operation and calibration by the capacitance sensor circuit 15 have been performed normally, and otherwise having an L level. Also, the switching signal OPT2 is a signal having an L level when the sensor capacitor 50 is connected between the electrode pads P2 and P0 of the IC chip 100, and having an H level when the sensor capacitor 50 is connected between the electrode pads P2 and P3.

FIG. 6 shows the correspondence relationship between the signal levels of the respective signals and the connective states of the terminals. That is, through the switching operation performed by the switching circuit SW according to the signal levels of the test mode signal TEST and the switching signal OPT2, the terminals have the connective states shown in FIG. 6.

If the test mode signal TEST and the switching signal OPT2 are both at the H level, for example, the switching circuit SW sets the input terminals CIN0M, CIN0M2, CIN1T, and CIN0T to ground potential. In this case, the switching circuit SW connects the input terminal CIN0P to a first relay terminal CIN0 thereof and connects the input terminal CIN1P to a second relay terminal CIN1 thereof.

If the test mode signal TEST is at the H level and the switching signal OPT2 is at the L level, for example, the switching circuit SW sets the input terminal CIN0M to a high impedance state, and sets the input terminals CIN0P, CIN1P, and CIN0T to ground potential. In this case, the switching circuit SW connects the input terminal CIN0M2 to the relay terminal CIN0 and connects the input terminal CIN1T to the relay terminal CIN1.

If the test mode signal TEST is at the L level and the switching signal OPT2 is at the H level, for example, the switching circuit SW sets the input terminals CIN0M, CIN0M2, CIN0P, and CIN1P to ground potential. In this case, the switching circuit SW connects the input terminal CIN1T to the relay terminal CIN1 and connects the input terminal CIN0T to the relay terminal CIN0.

Also, the switching circuit SW generates a test signal ITEST2 having an H level if the test mode signal TEST and the switching signal OPT2 are both at the H level, and an L level if either of TEST and OPT2 is at the L level. The switching circuit SW supplies the test signal ITEST2 to the first capacitance circuit CAP10 and supplies, to the second capacitance circuit CAP20, an inverted test signal ITESTB2 in which the level of the test signal ITEST2 is inverted (i.e., inverted from the L level to the H level or from the H level to the L level).

Also, the switching circuit SW generates a signal CIN0TP having the L level if the test mode signal TEST is at the H level and the switching signal OPT2 is at the L level, and otherwise having the H level. The switching circuit SW supplies the signal CIN0TP to the third capacitance circuit CAP30.

Returning to FIG. 5, the relay terminal CIN0 of the switching circuit SW is connected to the relay terminal CIN0 of the determination circuit JC. The relay terminal CIN1 of the switching circuit SW is connected to the relay terminal CIN1 of the determination circuit JC.

The determination circuit JC charges or discharges the sensor capacitor 50 via the relay terminal CIN0, the node n0 (or n20), the resistor R0 (or R2), and the electrode pad P0 (or P3). Also, the determination circuit JC charges or discharges the capacitance circuit CAP10 via the relay terminal CIN1, the node n1, and the resistor R1. Additionally, the determination circuit JC charges or discharges the capacitance circuit CAP20 via the relay terminal CIN1. Also, the determination circuit JC charges or discharges the capacitance circuit CAP30 via the relay terminal CIN0.

The determination circuit JC compares the potential of the relay terminal CIN0 generated by charging/discharging the sensor capacitor 50 to the potential of the relay terminal CIN1 generated by charging/discharging the capacitance circuit CAP10 (or CAP20). In this case, the determination circuit JC determines whether the capacitance of the sensor capacitor 50 has changed from the first capacitance to the second capacitance on the basis of the comparison result, and supplies a detection signal COUT indicating the determination result to the calibration circuit CAL and the controller 14. Additionally, the determination circuit JC determines whether the difference between the potential of the relay terminal CIN0 and the potential of the relay terminal CIN1 is less than a prescribed value, or in other words, if the potentials are substantially the same, and supplies a flag signal COUT2 indicating the determination result to the controller 14.

Also, the determination circuit JC executes a leak test of the capacitance sensor circuit 15 according to a leak test signal ILT supplied from the controller 14. During the leak test, the leak test signal ILT at the H level is supplied from the controller 14 to the determination circuit JC, thereby setting the node n0 or n20 connected to the sensor capacitor 50 and the node n1 connected to the capacitance circuit CAP10 to a high impedance state. As a result, it is possible to execute a screening test to detect short circuit defects or the like in the electrode pad P0 or P3 in the testing process after manufacturing of the IC chip 100.

The calibration circuit CAL receives, from the controller 14, a calibration enable signal CALEN, a sensor enable signal CSREN, a clock signal CLK, and first trimming signals TC<n:0> (n being an integer of two or greater).

The calibration enable signal CALEN is a binary signal for switching between normal mode for causing the determination circuit JC to undergo normal operation and calibration mode for executing a calibration operation. The calibration enable signal CALEN is at the H level when representing the calibration mode and at the L level in the normal mode, for example.

The sensor enable signal CSREN is a signal for switching the capacitance sensor circuit 15 between an active state (normal mode state for executing normal operation) and an inactive state (inactive mode state). The sensor enable signal CSREN represents the inactive mode when at the L level and represents the normal mode when at the H level.

The first trimming signals TC<n:0> are (n+1)-bit data signals for designating the capacitance set in the first capacitance circuit CAP10 or the second capacitance circuit CAP20 (i.e., the capacitance including the parasitic capacitance external to the IC chip 100 added to the capacitor 50). By designating the capacitance of the first capacitance circuit CAP10 or the second capacitance circuit CAP20 using the first trimming signals TC<n:0>, it is possible to cancel out the parasitic capacitance generated outside of the IC chip 100.

Also, the calibration circuit CAL receives the detection signal COUT outputted from the determination circuit JC.

The calibration circuit CAL generates the control signal ICAL, second trimming signals TCO<n:0>, selection signals ITC<n:0>, and a clock signal CLKIN according to the CALEN, CSREN, CLK, TC<n:0>, and COUT.

Figure 7:
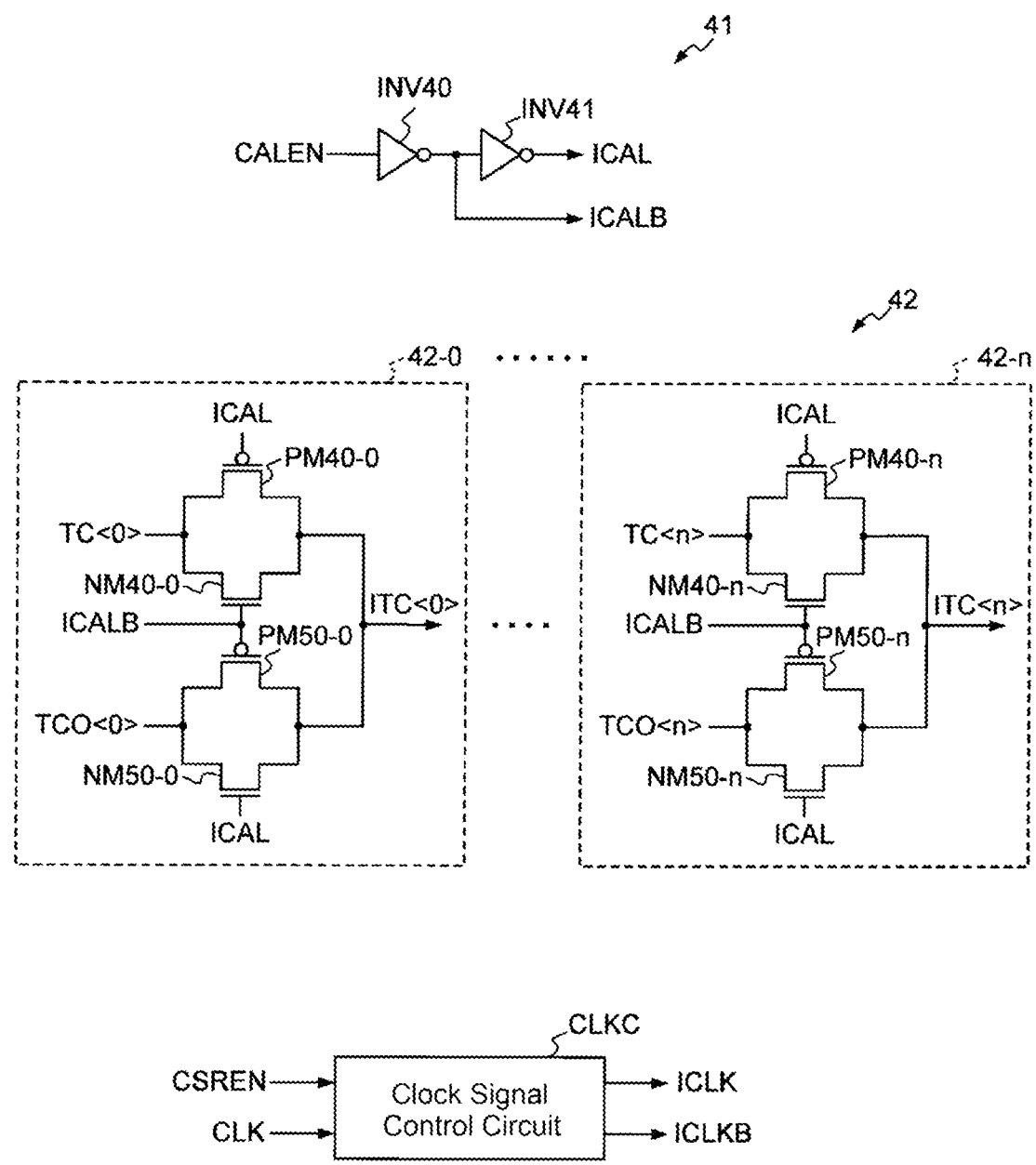
FIG. 7 is a circuit diagram showing a configuration of a calibration circuit.
Figure 8:
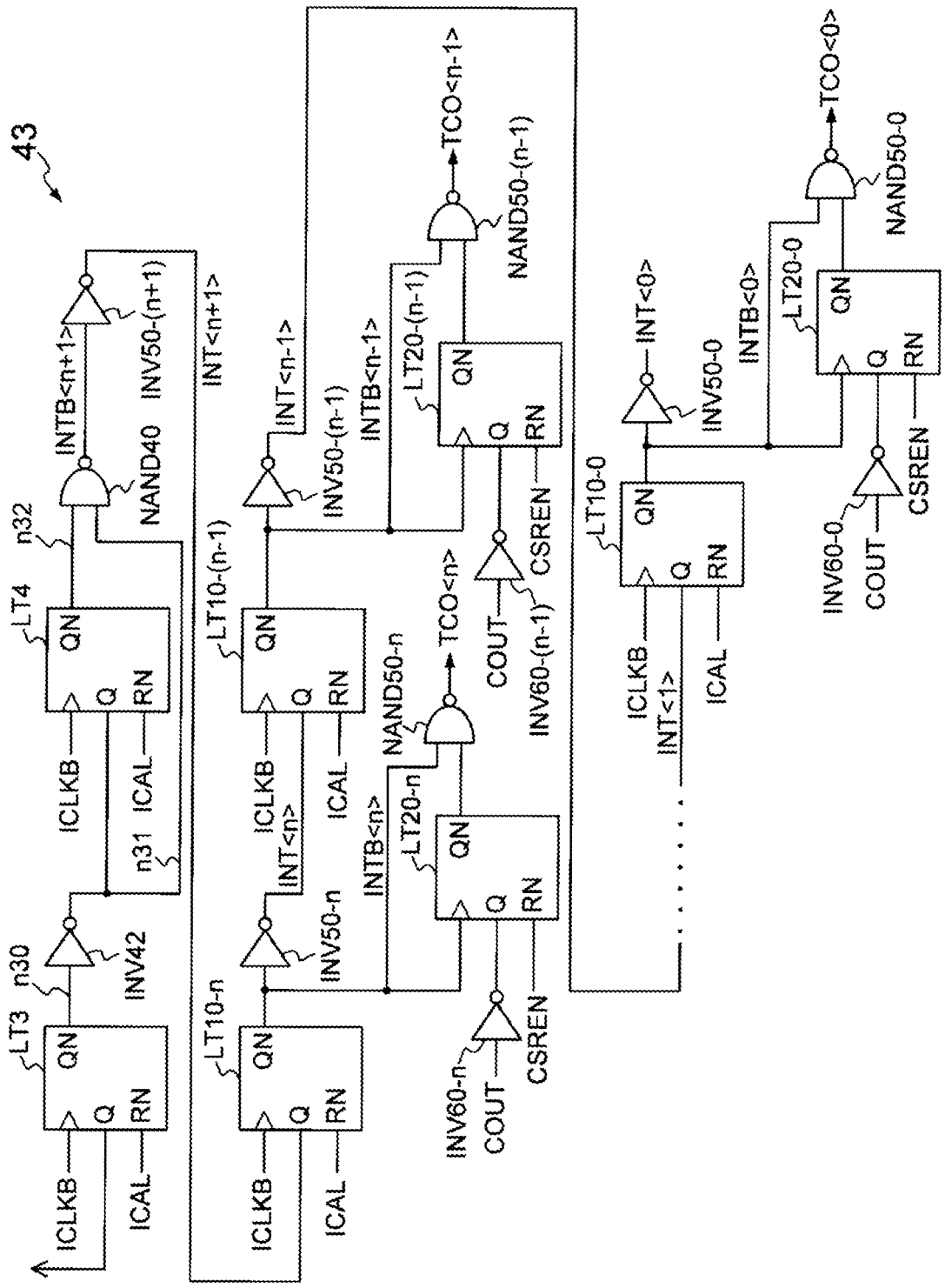
FIG. 8 is a circuit diagram showing a configuration of a trimming signal generating circuit.

FIGS. 7 and 8 are circuit diagrams showing a configuration of the calibration circuit CAL. The calibration circuit CAL includes a control circuit 41, a trimming signal selection circuit 42, and a clock signal control circuit CLKC shown in FIG. 7 as well as a trimming signal generating circuit 43 shown in FIG. 8.

The control circuit 41 is constituted of an inverter INV40 and an inverter INV41.

The output terminal of the inverter INV40 is connected to the input terminal of the inverter INV41. The calibration enable signal CALEN is supplied to the input terminal of the inverter INV40. The inverter INV40 outputs, as an inverted control signal ICALB, a signal attained by inverting the signal level of the binary calibration enable signal CALEN. The inverter INV41 outputs, as a control signal ICAL, a signal attained by inverting the signal level of the inverted control signal ICALB.

The control signal ICAL and the inverted control signal ICALB outputted from the control circuit 41 are supplied to the trimming signal selection circuit 42 and the trimming signal generating circuit 43, and as shown in FIG. 5, are supplied to the first capacitance circuit CAP10 and the second capacitance circuit CAP20.

The trimming signal selection circuit 42 is constituted of n+1 signal selection units 42-0 to 42-$n$.

The signal selection units 42-0 to 42-$n$ receive first selection signals TC<0> to TC<n> and second selection signals TCO<0> to TCO<n>.

The first selection signals TC<0> to TC<n> are signals forming each digit of the first trimming signals TC<n:0> transmitted from the controller 14, and each is binary, or in other words have prescribed L level or H level signal levels. The second selection signals TCO<0> to TCO<n> are signals forming each digit of the second trimming signals TC<n:0>, and each has binary signal levels (L level or H level). The second selection signals TCO<0> to TCO<n> are generated by the trimming signal generating circuit 43.

The signal selection unit 42-0 includes transistors PM40-0, NM40-0, PM50-0, and NM50-0. The control signal ICAL outputted from the control circuit 41 is supplied to the gate of the transistor PM40-0. The source of the transistor PM40-0 and the drain of the transistor NM40-0 are connected to each other, and receive the first selection signal TC<0>. The drain of the transistor PM40-0 is connected to the source of the transistor NM40-0.

The gate of the transistor NM40-0 and the gate of the transistor PM50-0 are connected to each other, and receive the inverted control signal ICALB. The source of the transistor PM50-0 and the drain of the transistor NM50-0 are connected to each other, and receive the second selection signal TCO<0>. The control signal ICAL outputted from the control circuit 41 is supplied to the gate of the transistor NM50-0. The drain of the transistor PM50-0 is connected to the source of the transistor NM50-0.

The connecting section between the drain of the transistor PM40-0 and the source of the transistor NM40-0 is connected to the connecting section between the drain of the transistor PM50-0 and the source of the transistor NM50-0, and the signal selection unit 42-0 outputs a selection signal ITC<0> from the connection terminal thereof.

The signal selection units 42-1 to 42-$n$ have a similar configuration. The signal selection unit 40-$n$ includes transistors PM40-$n$, NM40-$n$, PM50-$n$, and NM50-$n$, for example. The control signal ICAL outputted from the control circuit 41 is supplied to the gate of the transistor PM40-$n$. The source of the transistor PM40-$n$ and the drain of the transistor NM40-$n$ are connected to each other, and receive the first selection signal TC<n>. The drain of the transistor PM40-$n$ is connected to the source of the transistor NM40-$n$.

The gate of the transistor NM40-$n$ and the gate of the transistor PM50-$n$ are connected to each other, and receive the inverted control signal ICALB. The source of the transistor PM50-$n$ and the drain of the transistor NM50-$n$ are connected to each other, and receive the second selection signal TCO<n>. The control signal ICAL outputted from the control circuit 41 is supplied to the gate of the transistor NM50-$n$. The drain of the transistor PM50-$n$ is connected to the source of the transistor NM50-$n$.

The connecting section between the drain of the transistor PM40-$n$ and the source of the transistor NM40-$n$ is connected to the connecting section between the drain of the transistor PM50-$n$ and the source of the transistor NM50-$n$, and the signal selection unit 42-$n$ outputs a selection signal ITC<n> from the connection terminal thereof.

By the above configuration, the control circuit 41 and the trimming signal selection circuit 42 select either one of the first trimming signals TC<n:0> and the second trimming signals TCO<n:0> on the basis of the calibration enable signal CALEN.

In other words, the control circuit 41 and the trimming signal selection circuit 42 select the first trimming signals TC<n:0> if the calibration enable signal CALEN is at the L level. On the other hand, if the calibration enable signal CALEN is at the H level, the control circuit 41 and the trimming signal selection circuit 42 select the second trimming signals TCO<n:0>.

As shown in FIG. 5, the control circuit 41 and the trimming signal selection circuit 42 supply, to the first capacitance circuit CAP10 and the second capacitance circuit CAP20, whichever of the second trimming signals TCO<n:0> and the first trimming signals TC<n:0> was selected as the selection signals ITC<n:0>.

The clock signal control circuit CLKC receives the clock signal CLK and the sensor enable signal CSREN, which are both binary (H level, L level), outputted from the controller 14.

The clock signal control circuit CLKC generates a binary output clock signal ICLK and an inverted clock signal ICLKB generated by inverting the signal level of the output clock signal ICLK according to the clock signal CLK and the sensor enable signal CSREN. In other words, the clock signal control circuit CLKC generates the output clock signal ICLK fixed at the L level when the sensor enable signal CSREN is at the L level. On the other hand, when the sensor enable signal CSREN is at the H level, the clock signal control circuit CLKC generates the output clock signal ICLK at the same phase as the clock signal CLK.

The clock signal control circuit CLKC supplies the generated output clock signal ICLK to the determination circuit JC as the clock signal CLKIN and supplies the inverted clock signal ICLKB to the trimming signal generating circuit 43.

As shown in FIG. 8, the trimming signal generating circuit 43 includes latch circuits LT3, LT4, LT10-0 to 10-$n$, and LT20-0 to 20-$n$. Also, the trimming signal generating circuit 43 includes an inverter INV42, inverters INV50-0 to 50-(n+1), and inverters INV60-0 to 60-$n$. Additionally, the trimming signal generating circuit 43 includes a NAND 40 and NANDs 50-0 to 50-$n$.

A signal input terminal Q of the latch circuit LT3 is connected to a power source. A clock terminal of the latch circuit LT3 is supplied the inverted clock signal ICLKB. An input terminal RN of the latch circuit LT3 is supplied the control signal ICAL. An output terminal QN of the latch circuit LT3 is connected to the input terminal of the inverter INV42 via a node n30. The output terminal of the inverter INV42 is connected to the signal input terminal Q of the latch circuit LT4 via the node n31.

A clock terminal of the latch circuit LT4 is supplied the inverted clock signal ICLKB. An input terminal RN of the latch circuit LT4 is supplied the control signal ICAL. An output terminal QN of the latch circuit LT4 is connected to one input terminal of the NAND 40 via a node n32.

The other input terminal of the NAND 40 is connected to the output terminal of the inverter INV42. The output terminal of the NAND 40 is connected to the input terminal of the inverter INV50-(n+1). The NAND 40 supplies an output signal INTB<n+1> to the input terminal of the inverter INV50-(n+1). The inverter INV50-(n+1) supplies, to the latch circuit LT10-n, an output signal INT<n+1> generated by inverting the output signal INTB<n+1> from the NAND 40.

A clock terminal of the latch circuit LT10-n is supplied the inverted clock signal ICLKB. An input terminal RN of the latch circuit LT10-n is supplied the control signal ICAL. A signal input terminal Q of the latch circuit LT10-n is connected to the output terminal of the inverter INV50-(n+1). The latch circuit LT10-n outputs the output signal INTB<n> from the output terminal QN. The output terminal QN of the latch circuit LT10-n is connected to the input terminal of the inverter INV50-n, and is connected to either one of the clock terminal of the latch circuit LT20-n and the input terminal of the NAND 50-n.

The inverter INV50-n outputs an output signal INT<n> generated by inverting the output signal INTB<n> from the output terminal QN of the latch circuit LT10-n. The output terminal of the inverter INV50-n is connected to the signal input terminal of a latch circuit LT10-(n−1).

A clock terminal of the latch circuit LT10-(n−1) is supplied the inverted clock signal ICLKB. An input terminal RN of the latch circuit LT10-(n−1) is supplied the control signal ICAL. A signal input terminal Q of the latch circuit LT10-(n−1) is connected to the output terminal of the inverter INV50-n. The latch circuit LT10-n outputs the output signal INTB<n−1> from the output terminal QN. The output terminal QN of the latch circuit LT10-n is connected to the input terminal of the inverter INV50-(n−1), and is connected to either one of the clock terminal of the latch circuit LT20-(n−1) and the input terminal of the NAND 50-(n−1).

The inverter INV50-(n−1) outputs an output signal INT<n−1> generated by inverting the output signal INTB<n−1> from the output terminal QN of the latch circuit LT10-(n−1).

In a similar manner, a clock terminal of the latch circuit LT10-k (k being an integer of (n−2) to 1) is supplied the inverted clock signal ICLKB. An input terminal RN of the latch circuit LT10-k is supplied the control signal ICAL. A signal input terminal Q of the latch circuit LT10-k is connected to the output terminal of the inverter INV50-(k+1). The output terminal QN of the latch circuit LT10-k is connected to the input terminal of the inverter INV50-k, and is connected to either one of the clock terminal of the latch circuit LT20-k and the input terminal of the NAND 50-k.

A clock terminal of the latch circuit LT10-0 is supplied the inverted clock signal ICLKB. An input terminal RN of the latch circuit LT10-0 is supplied the control signal ICAL. A signal input terminal Q of the latch circuit LT10-0 is supplied the output signal INT<1> of the inverter INV50-n. The latch circuit LT10-0 outputs the output signal INTB<0> from the output terminal QN. The output terminal QN of the latch circuit LT10-0 is connected to the input terminal of the inverter INV50-0, and is connected to either one of the clock terminal of the latch circuit LT20-0 and the input terminal of the NAND 50-0.

The detection signal COUT outputted from the determination circuit JC is supplied to the input terminals of the inverters INV60-0 to 60-n. The inverters INV60-0 to 60-n supply, from the output terminals thereof to the signal input terminals Q of the latch circuits LT20-0 to 20-n, a signal generated by inverting the level of the detection signal COUT.

A clock terminal of the latch circuit LT20-n is supplied an output signal from the output terminal QN of the latch circuit LT10-n. An input terminal RN of the latch circuit LT20-n is connected to an enable terminal EN2 of the calibration circuit CAL and supplies the sensor enable signal CSREN. A signal input terminal Q of the latch circuit LT20-n is connected to the output terminal of the inverter INV60-n. An output terminal QN of the latch circuit LT20-n is connected to the other input terminal of the NAND 50-n.

A clock terminal of the latch circuit LT20-(n−1) is supplied an output signal from the output terminal QN of the latch circuit LT10-(n−1). An input terminal RN of the latch circuit LT20-(n−1) is supplied the sensor enable signal CSREN. A signal input terminal Q of the latch circuit LT20-(n−1) is connected to the output terminal of the inverter INV60-(n−1). An output terminal QN of the latch circuit LT20-(n−1) is connected to the other input terminal of the NAND 50-(n−1).

Similarly hereafter, in the latch circuit LT20-k (k being an integer of (n−2) to 0), the clock terminal is supplied an output signal from the output terminal QN of the latch circuit LT10-k. An input terminal RN of the latch circuit LT20-k is supplied the sensor enable signal CSREN. A signal input terminal Q of the latch circuit LT20-k is connected to the output terminal of the inverter INV60-k. An output terminal QN of the latch circuit LT20-k is connected to the other input terminal of the NAND 50-k.

In the latch circuits LT3, LT4, LT10-0 to 10-n, and LT20-0 to 20-n, when the signal level of the signal inputted to the input terminal RN is at the L level, the output signal from the output terminal QN is fixed at the H level. On the other hand, if the signal level of the signal inputted to the input terminal RN is at the H level, when the clock terminal receives a rising signal, a signal generated by inverting the signal inputted to the signal input terminal Q is outputted from the output terminal QN.

The NANDs 50-0 to 50-n generate, as the second selection signals TCO<0> to TC<n>, signals that are the NAND of the output signals from the latch circuits LT10-0 to 10-n and the output signals from the latch circuits LT20-0 to 20-n. As a result, the second trimming signals TCO<n:0> are generated by the calibration circuit CAL and supplied to the trimming signal selection circuit 42 and the controller 14.

The second trimming signals TCO<n:0> are temporarily stored in the memory 16 by the controller 14. Then, every time power is supplied, the controller 14 reads the second trimming signals TCO<n:0> from the memory 16 and supplies the signals to the calibration circuit CAL as the first trimming signals TC<n:0>.

Next, the first capacitance circuit CAP10, the second capacitance circuit CAP20, and the third capacitance circuit CAP30 shown in FIG. 5 will be described.

The capacitance circuits CAP10, CAP20, and CAP30 each include a plurality of capacitors, and are each a circuit in which it is possible to select the overall capacitance value of the circuit.

The capacitance circuit CAP10 is set to a non-testing mode upon receiving an L level test signal ITEST2 from the switching circuit SW and is set to a testing mode upon receiving an H level test signal ITEST2. The capacitance circuit CAP20 is set to a non-testing mode upon receiving an L level inverted test signal ITESTB2 from the switching circuit SW and is set to a testing mode upon receiving an H level inverted test signal ITESTB2. The capacitance circuit CAP30 is set to a non-testing mode upon receiving an L level signal CIN0TP from the switching circuit SW and is set to a testing mode upon receiving an H level signal CIN0TP.

Also, the capacitance circuits CAP10, CAP20, and CAP30 receive, from the controller 14, margin trimming signals TM<m:0> constituted of m bits (m being an integer of two or greater) and the switching signal OPT2.

The capacitance circuit CAP30 receives, from the controller 14, the enable signal EN and first capacitance value selection signals TP<k:0> used during the test mode. The first capacitance value selection signals TP<k:0> are (k+1)-bit data signals causing selection of the capacitance value of the capacitance circuit CAP30, assuming the parasitic capacitance outside of the IC chip 100 added to the sensor capacitor 50.

When the signal level of the enable signal EN is at the H level, the capacitance circuit CAP30 activates the margin trimming signals TM<m:0>. On the other hand, when the signal level of the enable signal EN is at the L level, the capacitance circuit CAP30 deactivates the margin trimming signals TM<m:0>.

Also, the capacitance circuit CAP30 receives, from the controller 14, second capacitance selection signals TS<j:0> used during the test mode. The second capacitance value selection signals TS<j:0> are (j+1)-bit data signals that cause selection of the capacitance value of the capacitance circuit CAP30 according to the capacitance elements constituting the memory 16 during a capacitance determination operation for determining the capacitance of the memory 16 shown in FIG. 4.

Next, the configuration of the capacitance circuits CAP10 and CAP20 will be described. The capacitance circuits CAP10 and CAP20 have the same circuit configuration other than the fact that the CAP10 receives the test signal ITEST2 and the CAP20 receives the inverted test signal ITESTB2. Below, the circuit configuration of the capacitance circuit CAP10 will be described, and description of the circuit configuration of the capacitance circuit CAP20 will be omitted.

Figure 9:
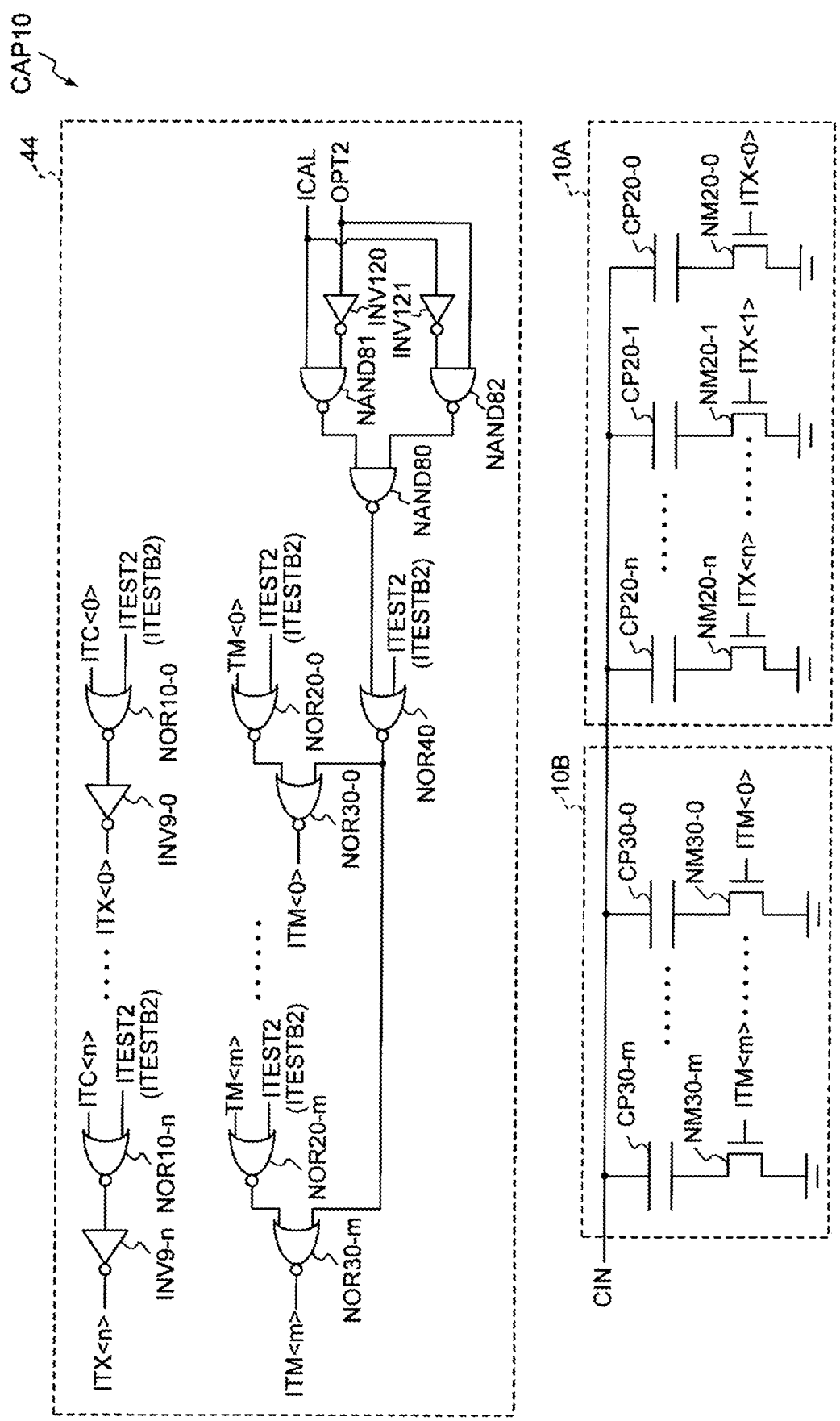
FIG. 9 is a circuit diagram showing a configuration of a capacitance circuit CAP10.

FIG. 9 is a circuit diagram showing the configuration of the capacitance circuit CAP10. The capacitance circuit CAP10 has a first circuit unit 10A, a second circuit unit 10B, and a signal generating circuit 44.

The first circuit unit 10A includes capacitors CP20-0, CP20-1 ... CP20-$n$, and transistors NM20-0, NM20-1 ... NM20-$n$ that are N-channel MOSFETs. The capacitors CP20-0 to CP20-$n$ each have one terminal connected to the capacitance connection terminal CIN via a common line and another terminal connected to the drain of each of the transistors NM20-1 to NM20-$n$. The transistors NM20-0 to NM20-$n$ respectively have sources that are grounded and gates to which the selection signals ITX<0> to ITX<n> are respectively supplied.

The second circuit unit 10B includes m+1 capacitors CP30-0 to CP30-$m$, and m+1 transistors NM30-0 to NM30-$m$ that are N-channel MOSFETs. The capacitors CP30-0 to CP30-$m$ each have one terminal connected to the capacitance connection terminal CIN via a common line. The other terminal of the capacitor CP30-0 is connected to the drain of the transistor NM30-0. Similarly, the other terminals of the capacitors CP30-1 to 30-$m$ are respectively connected to the drains of the transistors NM30-1 to 30-$m$. The sources of the transistors NM30-0 to 30-$m$ are grounded. The transistors NM30-0 to 30-$m$ respectively have gates to which the selection signals ITM<0> to ITM<m> are respectively supplied.

The capacitors CP20-0 to 20-$n$ constituting the first circuit unit 10A and the capacitors CP30-0 to 30-$m$ constituting the second circuit unit 10B are each constituted of capacitors having a fixed capacitance value (a known reference capacitance). By selectively turning ON/OFF the transistors NM20-0 to NM20-$n$ and the transistors NM30-0 to 30-$m$, the capacitors CP20-0 to 20-$n$ and the capacitors CP30-0 to 30-$m$ are controlled so as to switch between a connected state and a disconnected state between the common line and a ground potential (i.e., a prescribed potential) line.

The signal generating circuit 44 includes n+1 inverters including INVs 9-0 to 9-$n$, and n+1 NOR gate circuits including NORs 10-0 to 10-$n$.

Additionally, the signal generating circuit 44 includes two inverters including INVs 120 and 121, three NAND gate circuits including NANDs 80 to 82, m+1 NOR gate circuits including NORs 20-0 to 20-$m$, m+1 NOR gate circuits including NORs 30-0 to 30-$m$, and one NOR gate circuit that is a NOR 40.

The output terminals of the NORs 10-0 to 10-$n$ are respectively connected to the input terminals of the INVs 9-0 to 9-$n$. One of the input terminals of each of the NORs 10-0 to 10-$n$ has supplied thereto the selection signals ITC<0> to ITC<n> outputted from the calibration circuit CAL. The other of the input terminals of the NORs 10-0 to 10-$n$ has supplied thereto the test signal ITEST2 (ITESTB2 in the case of the CAP20).

The INVs 9-0 to 9-$n$ supply a signal generated by inverting the level of the output signals from the NORs 10-0 to 10-$n$ as the selection signals ITX<0> to ITX<n> to the transistors NM20-0 to NM20-$n$.

The output terminals of the NORs 20-0 to 20-$m$ are each connected to one input terminal of each of the NORs 30-0 to 30-$m$. One input terminal of each of the NORs 20-0 to 20-$m$ receives the margin trimming signals TM<m:0> transmitted from the controller 14. The other of the input terminals of the NORs 20-0 to 20-$m$ has supplied thereto the test signal ITEST2 (ITESTB2 in the case of the CAP20).

The other input terminal of each of the NORs 30-0 to 30-$m$ is connected to the output terminal of the NOR 40.

One input terminal of the NOR 40 is connected to the output terminal of the NAND 80, and the other input terminal has supplied thereto the test signal ITEST2 (ITESTB2 in the case of the CAP20). One input terminal of the NAND 81 has supplied thereto the control signal ICAL outputted from the calibration circuit CAL, and the other input terminal is connected to the output terminal of the INV 120. The input terminal of the INV 120 has supplied thereto the switching signal OPT2 transmitted from the controller 14. One input terminal of the NAND 82 has supplied thereto the control signal ICAL, and the other input terminal is connected to the output terminal of the INV 121. The input terminal of the INV 121 has supplied thereto the switching signal OPT2.

The NORs 30-0 to 30-$m$ output the selection signals ITM<0> to ITM<m> and supply the signals to the gates of the respective transistors NM30-0 to NM30-$m$.

According to this configuration, the CAP10 is a variable capacitor of which the capacitance changes due to the selection signals ITC<0> to ITC<n> and the margin trimming signals TM<m:0> while receiving the L level test signal ITEST2 (ITESTB2 in the case of the CAP20). That is, in this case, the CAP10 is a capacitor of which the capacitance is set by the selection signals ITC<0> to ITC<n> and the margin trimming signals TM<m:0>.

On the other hand, while receiving the H level test signal ITEST2 (ITESTB2 in the case of the CAP20), the CAP10 is equivalent to a capacitor having a capacitance equal to the capacitances of all of the capacitors CP20-0 to 20-n and CP30-0 to 30-m added together.

When the sensor capacitor 50 is connected to the electrode pads P0 and P2, the CAP10 provides a first reference capacitance for determining whether or not the capacitance of the sensor capacitor 50 has fallen to less than or equal to a prescribed value. When the sensor capacitor 50 is connected to the electrode pads P3 and P2, the CAP20 provides a second reference capacitance for determining whether or not the capacitance of the sensor capacitor 50 has fallen to less than or equal to a prescribed value.

Next, the configuration of the capacitance circuit CAP30 will be described. The capacitance circuit CAP30 is used for performing a test to determine whether the detection operation and calibration by the capacitance sensor circuit 15 have been performed normally when the sensor capacitor 50 is not externally connected, or in other words, with the IC chip 100 alone. That is, the capacitance circuit CAP30 functions as the sensor capacitor 50 when performing testing.

The capacitance circuit CAP30 includes a determination capacitance unit used for determining the capacitance of the memory 16 determined by the film thickness of the gate insulating film constituting the memory 16, which is a semiconductor memory (hereinafter referred to as the capacitance of film thickness of memory 16). The capacitance circuit CAP30 is a circuit functioning as the sensor capacitor 50 when performing capacitance determination (capacitance determination mode) using the determination capacitance unit.

Figure 10:
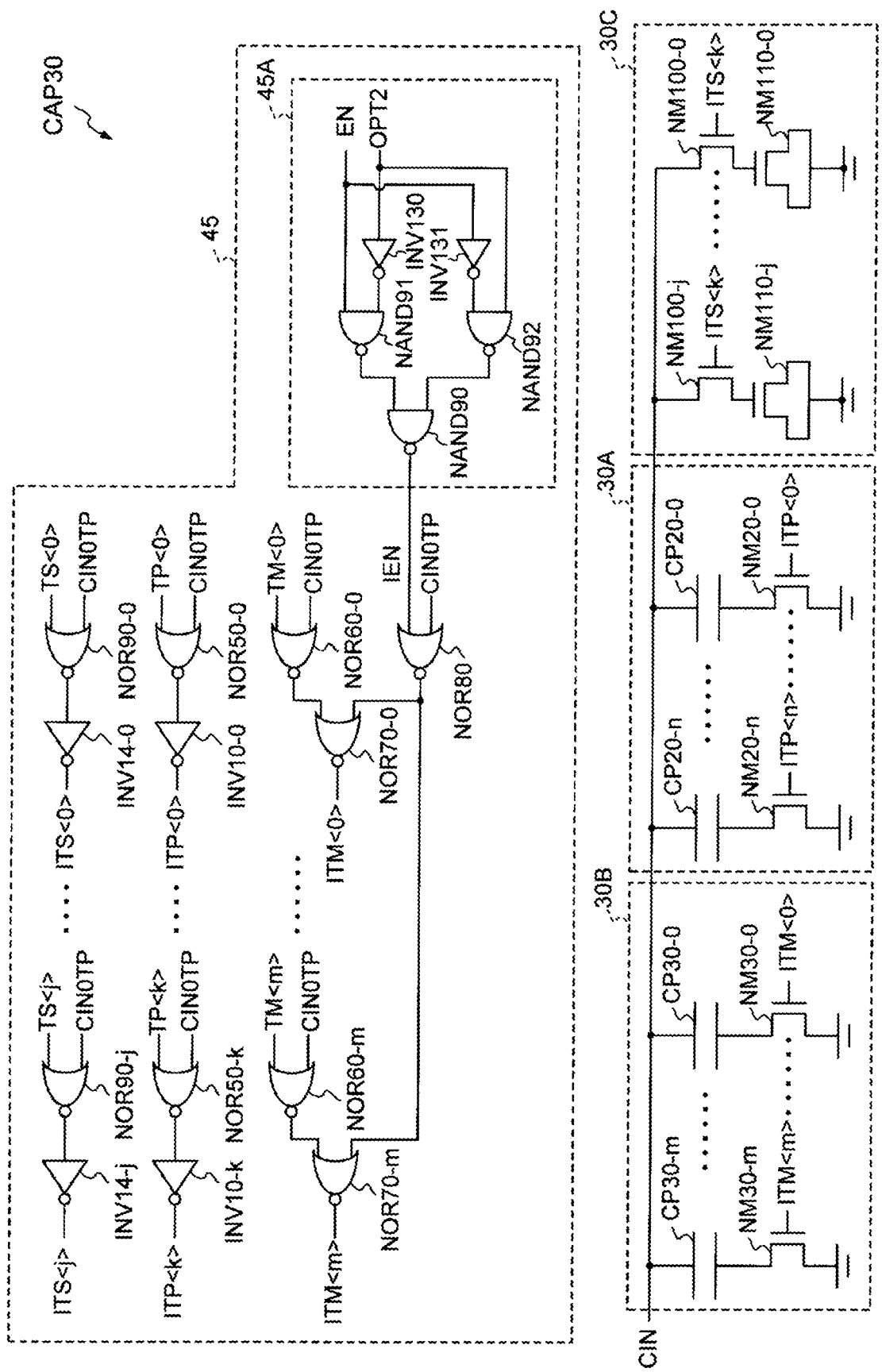
FIG. 10 is a circuit diagram showing a configuration of a capacitance circuit CAP30 according to Embodiment 1.

FIG. 10 is a circuit diagram showing the configuration of the capacitance circuit CAP30. The capacitance circuit CAP30 has a first circuit unit 30A, a second circuit unit 30B, a third circuit unit 30C, and a signal generating circuit 45.

The first circuit unit 30A includes n+1 capacitors CP40-0 to CP40-n, and n+1 transistors NM80-0 to NM80-n that are N-channel MOSFETs. The capacitors CP40-0 to CP40-n each have one terminal connected to the capacitance connection terminal CIN via a common line and another terminal connected to the drain of each of the transistors NM80-1 to NM80-n. The transistors NM80-0 to NM80-n respectively have sources that are grounded and gates to which the selection signals ITP<0> to ITP<n> are respectively supplied.

The second circuit unit 30B includes m+1 capacitors 50-0 to 50-m and m+1 transistors NM90-0 to 90-m that are N-channel MOSFETs. The capacitors CP50-0 to CP50-m each have one terminal connected to the capacitance connection terminal CIN via a common line. Similarly, the other terminals of the capacitors CP50-0 to 50-m are respectively connected to the drains of the transistors NM90-0 to 90-m. The sources of the transistors NM90-0 to 90-m are grounded. The transistors NM90-0 to 90-m respectively have gates to which the selection signals ITM<0> to ITM<m> are respectively supplied.

The capacitors CP40-0 to 40-n constituting the first circuit unit 30A and the capacitors CP50-0 to 50-m constituting the second circuit unit 30B are each constituted of capacitors having a fixed capacitance value (a known reference capacitance). By selectively turning ON/OFF the transistors NM80-0 to NM80-n and the transistors NM90-0 to 90-m, the capacitors CP40-0 to 40-n and the capacitors CP50-0 to 50-m are controlled so as to switch between a connected state and a disconnected state between the common line and a ground potential (i.e., a prescribed potential) line.

The third circuit unit 30C includes j+1 N-channel MOSFET transistors NM100-0 to 100-j and also j+1 N-channel MOSFET transistors NM110-0 to 110-j.

The drains of the transistors NM100-0 to 100-j are connected to the capacitance connection terminal CIN via a common line. The transistors NM100-0 to 110-j respectively have gates to which the selection signals ITS<0> to ITS<j> (ITS<k>) are respectively supplied. The sources of the transistors NM100-0 to 110-j are connected to the gates of the transistors NM110-0 to 110-j. The source and drain of each of the transistors NM110-0 to 110-j are connected to each other and grounded.

The third circuit unit 30C is a circuit block used for simulating determination of the capacitance of the film thickness of the memory 16 shown in FIG. 4. The transistors NM110-0 to 110-j of the third circuit unit 30D are constituted of the same capacitance elements as the memory 16 (i.e., capacitance elements having the same structure formed on the same substrate), and have the same film thickness as the MOSs constituting the memory 16. Thus, by determining the capacitance of the transistors NM110-0 to 110-j, it is possible to simulate determination of the capacitance of the film thickness of the memory 16.

The signal generating circuit 45 includes k+1 inverters including INVs 10-0 to 10-k and k+1 NOR gate circuits including NORs 50-0 to 50-k.

Additionally, the signal generating circuit 45 includes two inverters including INVs 130 and 131, three NAND gate circuits including NANDs 90 to 92, m+1 NOR gate circuits including NORs 60-0 to 60-m, m+1 NOR gate circuits including NORs 70-0 to 70-m, and one NOR gate circuit that is a NOR 80.

The output terminals of the NORs 50-0 to 50-k are respectively connected to the input terminals of the INVs 10-0 to 10-k. One input terminal of each of the NORs 50-0 to 50-k has supplied thereto the selection signal TP<0> to TK<k> transmitted from the controller 14. The other of the input terminals of each of the NORs 50-0 to 50-k has supplied thereto the signal CIN0TP outputted from the calibration circuit CAL.

The INVs 10-0 to 10-k supply a signal generated by inverting the level of the output signals from the NORs 50-0 to 50-k as the selection signals ITP<0> to ITP<k> to the transistors NM80-0 to NM80-k.

The output terminals of the NORs 60-0 to 60-m are each connected to one input terminal of each of the NORs 70-0 to 70-m. One input terminal of each of the NORs 60-0 to 60-m receives the margin trimming signals TM<m:0> transmitted from the controller 14. The other of the input terminals of the NORs 60-0 to 60-m has supplied thereto the signal CIN0TP.

The other input terminal of each of the NORs 70-0 to 70-m is connected to the output terminal of the NOR 80.

One input terminal of the NOR 80 is connected to the output terminal of the NAND 90, and the other input terminal has supplied thereto the signal CIN0TP. One input terminal of the NAND 91 has supplied thereto the enable signal EN transmitted from the controller 14, and the other input terminal is connected to the output terminal of the INV 130. The input terminal of the INV 130 has supplied thereto the switching signal OPT2 transmitted from the controller 14. One input terminal of the NAND 92 has supplied thereto the switching signal OPT2, and the other input terminal is connected to the output terminal of the INV 131. The input terminal of the INV 131 has supplied thereto the enable signal EN.

The NORs 70-0 to 70-*m* output the selection signals ITM<0> to ITM<m> and supply the signals to the gates of the respective transistors NM90-0 to NM90-*m*.

Also, the signal generating circuit 45 includes j+1 inverters including INVs 14-0 to 14-*n*, and j+1 NOR gate circuits including NORs 90-0 to 90-*j*.

The output terminals of the NORs 90-0 to 90-*j* are connected respectively to the input terminals of the INVs 14-0 to 14-*j*. One input terminal of each of the NORs 90-0 to 90-*j* has supplied thereto the selection signal TS<0> to TS<j> transmitted from the controller 14. The other of the input terminals of each of the NORs 90-0 to 90-*j* has supplied thereto the signal CIN0TP outputted from the calibration circuit CAL.

The INVs 14-0 to 14-*j* supply a signal generated by inverting the level of the output signals from the NORs 90-0 to 90-*j* as the selection signals ITS<0> to ITS<j> to the transistors NM120-0 to NM120-*j*.

Next, the operation of the capacitance sensor circuit 15 will be explained. The capacitance sensor circuit 15 of the present embodiment performs calibration of automatically correcting the capacitance of the capacitance circuit CAP10, CAP20, or CAP30, which is a variable capacitor, to a capacitance corresponding to the capacitance of the sensor capacitor 50 externally connected to the IC chip 100. Also, the capacitance sensor circuit 15 performs operations in the capacitance determination mode for determining the capacitance values of the transistors NM110-0 to 110-*j* for suitably controlling the rewrite voltage of the memory 16 according to the capacitance of the film thickness thereof.

First, if a relatively low capacitance capacitor is used as the sensor capacitor 50, then as previously described, one electrode W1 of the sensor capacitor 50 is connected to the electrode pad P0 of the IC chip 100 while the other electrode W2 of the sensor capacitor 50 is connected to the electrode pad P2. On the other hand, if a relatively high capacitance capacitor is used as the sensor capacitor 50, then the one electrode W1 of the sensor capacitor 50 is connected to the electrode pad P3 of the IC chip 100 while the other electrode W2 of the sensor capacitor 50 is connected to the electrode pad P2.

Next, calibration is performed for automatically correcting the capacitance of the capacitance circuit CAP10, CAP20, or CAP30, which is a variable capacitor, to a capacitance corresponding to the capacitance of the sensor capacitor 50 externally connected to the IC chip 100.

As described above, if the sensor capacitor 50 is connected to the electrode pads P0 and P2, only the CAP10 is used among the capacitance circuits CAP10 and CAP20, and if the sensor capacitor 50 is connected to the electrode pads P3 and P2, only the capacitance circuit CAP20 is used. In this case, the calibration operation on the CAP10 and the CAP20 is the same, and thus, the calibration operation performed on the CAP10 when the sensor capacitor 50 is connected to the electrode pads P0 and P2 will be described here.

The controller 14 first supplies the L level test mode signal TEST to the switching circuit SW as well as supplying the L level leak test signal ILT to the determination circuit JC. Additionally, the controller 14 supplies the L level switching signal OPT2 for designating the CAP10 among the capacitance circuits CAP10 and CAP20 to the switching circuit SW and the capacitance circuits CAP10, CAP20, and CAP30.

As a result, the switching circuit SW connects the electrode W1 of the sensor capacitor 50 to the relay terminal CIN0 of the determination circuit JC via the node n0, the resistor R0, and the electrode pad P0. Also, the switching circuit SW connects the capacitance connection terminal CIN of the capacitance circuit CAP10 to the relay terminal CIN1 of the determination circuit JC.

Additionally, the switching circuit SW applies an L level signal to the node n20, the other terminal of the additional capacitor CX, and the capacitance connection terminal CIN of each of the capacitance circuits CAP20 and CAP30. As a result, the capacitance connection terminals CIN of the capacitance circuit CAP30 and the capacitance circuit CAP20 are both not connected to the determination circuit JC, and thus, the capacitance circuits CAP30 and CAP20 do not contribute to the operation of the capacitance sensor circuit 15.

Figure 11:
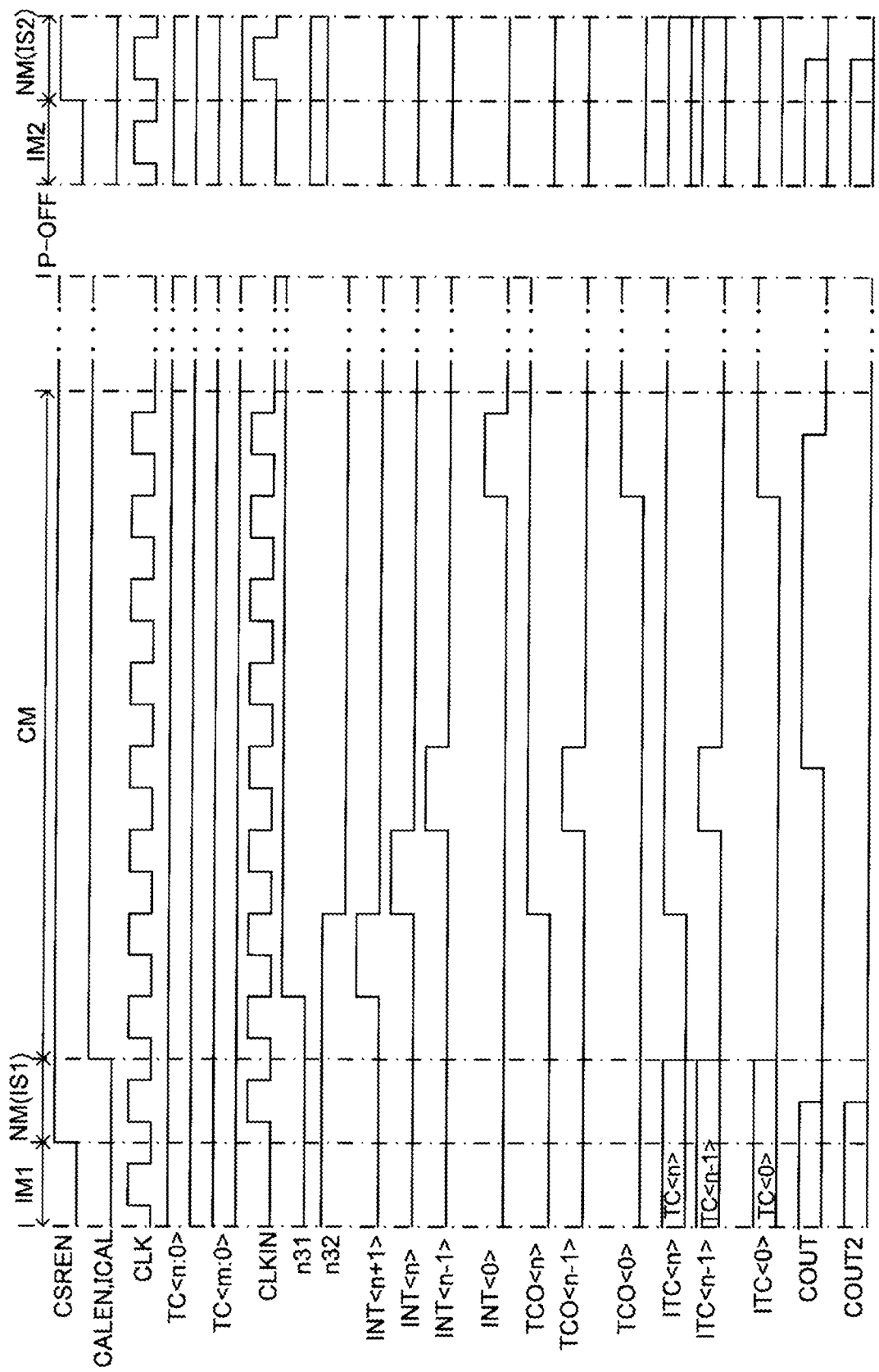
FIG. 11 is a timing chart showing a calibration operation.

FIG. 11 is a timing chart representing the calibration operation executed by the calibration circuit CAL through control by the controller 14.

[Inactive Mode IM1]

First, the controller 14 supplies the L level sensor enable signal CSREN and calibration enable signal CALEN to the calibration circuit CAL. As a result, the input terminals RN of the latch circuits LT20-0 to 20-*n* shown in FIG. 9 are all at the L level. At this time, the output clock signal ICLK is at the L level, the inverted clock signal ICLKB is at the H level, the control signal ICAL is at the L level, and the inverted control signal ICALB is at the L level.

The gates of the transistors PM40-0 to 40-*n* of the trimming signal selection circuit 42 shown in FIG. 7 turn ON upon receiving the L level control signal ICAL. Also, the gates of the transistors NM40-0 to 40-*n* turn ON upon receiving the H level inverted control signal ICALB.

On the other hand, the gates of the transistors PM50-0 to 50-*n* turn OFF upon receiving the H level inverted control signal ICALB. Also, the gates of the transistors NM50-0 to 50-*n* turn OFF upon receiving the L level control signal ICAL. As a result, the trimming signal selection circuit 42 receives the first selection signals TC<0> to TC<n> as the selection signals ICT<0> to ITC<n>. In other words, the first trimming signals TC<n:0> are outputted as the selection signals ITC<n:0>.

Also, the latch circuit LT3, the latch circuit LT4, the latch circuits LT10-0 to 10-*n*, and the latch circuits LT20-0 to 20-*n* of the trimming signal generating circuit 43 shown in FIG. 8 output an H level signal from the output terminal QN. Thus, the INT<n+1:0> (i.e., the INT<n+1>, INT<n> . . . INT<0>) and the TCO<n:0> (i.e., the TCO<n>, TCO<n−1> . . . TCO<0>) are all at the L level.

In this case, the output clock signal ICLK is at the L level, and thus, the clock signal CLKIN is also at the L level. The clock signal CLKIN is at the L level, and thus, the H level, which is the immediately preceding data value, is maintained in the detection signal COUT and the flag signal COUT2. In FIG. 11, the period of this state is indicated as an inactive mode IM1.

[Normal Mode NM (Initial State IS1)]

Then, the controller 14 causes the sensor enable signal CSREN to shift from the L level to the H level. As a result, the clock signal control circuit CLKC generates the output clock signal ICLK at the same phase as the clock signal CLK, and outputs the inverted clock signal ICLKB as an inverted signal of the clock signal CLK. In this case, the signals outputted from the output terminals QN of the latch circuits LT3, LT4, LT10-0 to 10-$n$, and LT20-0 to 20-$n$ shown in FIG. 9 are maintained at the H level, and thus, the signals INT<$n$+1:0> and TCO<$n$:0> are all maintained at the L level.

The output clock signal ICLK is a signal at the same phase as the clock signal CLK, and thus, the clock signal CLKIN is also at the same phase as the clock signal CLK. The capacitance sensor circuit 15 operates as a result of a rise in the clock signal CLKIN, and outputs the detection signal COUT and the flag signal COUT2. If, for example, the dielectric between the electrodes of the sensor capacitor 50 is in the solid state prior to melting and the capacitance value of the capacitance circuit CAP10 is less than that of the sensor capacitor 50, then the detection signal COUT and the flag signal COUT2 are both at the L level. In FIG. 11, the period of this state is indicated as a normal mode NM (initial state IS1).

[Calibration Mode CM]

Then, the controller 14 causes the calibration enable signal CALEN to shift from the L level to the H level. As a result, the control signal ICAL is at the H level and the inverted control signal ICALB is at the L level. The gates of the transistors PM40-0 to 40-$n$ of the trimming signal selection circuit 42 turn OFF upon receiving the H level control signal ICAL, and gates of the transistors NM40-0 to 40-$n$ turn OFF upon receiving the L level inverted control signal ICALB. On the other hand, the gates of the transistors PM50-0 to 50-$n$ turn ON upon receiving the L level inverted control signal ICALB, and the gates of the transistors NM50-0 to 50-$n$ turn ON upon receiving the H level control signal ICAL.

As a result, the trimming signal selection circuit 42 receives the second selection signals TCO<0> to TCO<$n$> as the selection signals ICT<0> to ITC<$n$>. In other words, the second trimming signals TCO<$n$:0> are outputted as the selection signals ITC<$n$:0>. The signals INT<$n$+1:0> and TCO<$n$:0> are both at the L level, and thus, all of the selection signals ITC<$n$:0> are also at the L level.

If the clock signal CLK is inputted to the calibration circuit CAL in this state, then upon the initial fall of the clock signal CLK, the potential at the node n31 of the trimming signal generating circuit 43 shown in FIG. 8 rises, and the potential of the node n32 falls upon the second fall of the clock signal CLK. As a result, the output signal INT<$n$+1> of the inverter INV50-($n$+1) of the trimming signal generating circuit 43 is at the H level only between the first clock pulse of the clock signal CLK and the second clock pulse during the calibration mode NM.

Here, the circuit constituted of the latch circuits LT10-$n$ to 10-0 and the inverters INV50-$n$ to 50-0 of FIG. 8 is a shift register that outputs the INT<$n$:0> while shifting each bit. Thus, the H pulse of the output signal INT<$n$+1> is shifted to INT<0> in sequential order from the output signal INT<$n$> after the third fall of the clock signal CLK. When the output signal INT<$n$> is at the H level, the output signal INTB<$n$> is at the L level, and thus, the second selection signal TCO<$n$> is at the H level. At this time all of the signals INT<$n$−1:0> are at the L level.

In this manner, the second trimming signals TCO<$n$:0> are outputted as the selection signals <$n$:0>, and thus, among the capacitors 20-$n$ to 20-0 of the capacitance circuit CAP10 shown in FIG. 9, only the capacitor CAP20-$n$ functions to provide capacitance and the others do not function. On the other hand, in the capacitors CAP30-$m$ to 30-0, when the calibration enable signal CALEN is at the H level, the control signal ICAL is also at the H level. Thus, the ITM<$m$:0> (i.e., the selection signals ITM<0> to ITM<$m$>) become the same signals as the margin trimming signals TM<$m$:0>, and the capacitors CAP30-$m$ to 30-0 function as capacitors having capacitances corresponding to the signal input of the margin trimming signals TM<$m$:0>.

When the clock signal CLK rises in this state, the detection signal COUT outputted from the determination circuit JC is supplied to the calibration circuit CAL. Thus, with the subsequent fall of the clock signal CLK, the INTB<$n$> rises and the INT<$n$> falls, and therefore, the inverted signal generated by inverting the detection signal COUT is stored in the latch circuit 20-$n$ of the trimming signal generating circuit 43 shown in FIG. 8. This is stored as the output data of the second selection signal TCO<$n$> while the calibration enable signal CALEN is at the H level.

Here, the capacitance sensor circuit 15 of the present embodiment outputs the L level detection signal COUT if the dielectric between the electrodes of the sensor capacitor 50 is in a solid state prior to melting, and outputs the H level detection signal COUT after melting of the dielectric.

In other words, if the capacitance of the capacitance circuit CAP10 (reference capacitance) is determined by the determination circuit JC of the capacitance sensor circuit 15 to be less than the capacitance of the sensor capacitor 50, then the detection signal COUT is shifted to the L level, and as a result, an H level second selection signal TCO<$n$> is outputted. On the other hand, if the capacitance of the capacitance circuit CAP10 is determined by the determination circuit JC to be greater than the capacitance of the sensor capacitor 50, then the detection signal COUT is shifted to the H level, and as a result, an L level second selection signal TCO<$n$> is outputted.

Then, as a result of the next clock pulse, the TCO<$n$−1> shifts to the H level and all of the signals INT<$n$−2:0> remain at the L level. Thus, the capacitor CAP20-$n$ of the capacitance circuit CAP10 provides capacitance if the TCO<$n$> is at the H level, or in other words, if the capacitance circuit CAP10 has a lower capacitance than the sensor capacitor 50. On the other hand, when the TCO<$n$> is at the L level, or in other words, the capacitance circuit CAP10 has a higher capacitance than the sensor capacitor 50, the capacitor 20-$n$ of the capacitance circuit CAP10 does not function as a capacitor.

Also, among the capacitors CAP20-($n$−1) to 20-0 shown in FIG. 9, only the CAP20-($n$−1) functions as a capacitor, and the other capacitors do not function as capacitors. When the clock signal CLK rises in this state, the detection signal COUT outputted from the determination circuit JC is supplied to the calibration circuit CAL. In this case, with the subsequent fall of the clock signal CLK, the INTB<$n$−1> rises and the INT<$n$−1> falls. As a result, the inverted signal generated by inverting the signal level of the detection signal COUT is stored in the latch circuit 20-($n$−1) of the trimming signal generating circuit 43 shown in FIG. 8, and is retained as the second selection signal TCO<$n$−1> while the calibration enable signal CALEN is at the H level.

Thereafter, the inverted signal generated by inverting the signal level of the detection signal COUT is stored in the latch circuit LT20-0, and a similar process is repeated until this signal is stored as the TCO<0> while the calibration enable signal CALEN is at the H level.

In this manner, a series of operations are performed such that while the calibration enable signal CALEN is at the H level, if the capacitance of the sensor capacitor 50 is greater than the capacitance of the capacitance circuit CAP10, the capacitance of the capacitance circuit CAP10 is reduced, and if the capacitance of the sensor capacitor 50 is less than the capacitance of the capacitance circuit CAP10, then the capacitance of the capacitance circuit CAP10 is increased. In other words, the second trimming signals TCO<n:0> are set such that the capacitance of the capacitance circuit CAP10 is equal to the capacitance of the sensor capacitor 50 in a solid state. In FIG. 11, the period of this state is indicated as a calibration mode CM. During the calibration mode, the controller 14 supplies, to the capacitance circuit CAP10, the margin trimming signals TM<m:0> that set as the margin half of the difference between the capacitance of the sensor capacitor 50 prior to melting of the dielectric and the capacitance of the sensor capacitor 50 after melting of the dielectric, for example. Then, after the end of calibration, the controller 14 stores, in the non-volatile memory 16, the second trimming signals TCO<n:0> immediately after calibration has ended.

[Inactive Mode IM2]

Then, when supply of power is stopped (P-OFF period of FIG. 11) and then resumed, the controller 14 reads the second trimming signals TCO<n:0> from the memory 16 and supplies the signals to the calibration circuit CAL as the first trimming signals TC<n:0>. In FIG. 11, the period of this state is indicated as an inactive mode IM2.

[Normal Mode NM (Initial State IS2)]

Then, the controller 14 shifts the sensor enable signal CSREN from the L level to the H level, and operates the capacitance sensor circuit 15 by supplying the L level calibration enable signal CALEN to the calibration circuit CAL. In this case, the calibration enable signal CALEN and the switching signal OPT2 are both at the L level, and thus, all (m+1)-bit ITM<m:0> signals (i.e., selection signals ITM<0> to ITM<m>) of the signal generating circuit 44 shown in FIG. 9 are at the L level. As a result, none of the capacitors CAP30-0 to 30-m function as capacitors.

Thus, the capacitance of the capacitance circuit CAP10, or in other words, the reference capacitance is set as a capacitance value between the first capacitance prior to melting of the dielectric of the sensor capacitor 50 including the parasitic capacitance outside of the IC chip 100, and the second capacitance after melting of the dielectric. In FIG. 11, the period of this state is indicated as a normal mode NM (initial state IS2).

Essentially, in the series of calibration processes described above, the controller 14 supplies, to the second circuit unit 10B, the margin trimming signal TM (referred to as the first trimming signal) that sets the capacitance of the second circuit unit 10B of the capacitance circuit CAP10 to the margin capacitance. The calibration circuit CAL executes calibration for supplying, to the first circuit unit 10A, the second trimming signal TCO(ITC) for setting the capacitance of the first circuit unit 10A of the capacitance circuit CAP10 to a capacitance that changes in stages with the passage of time.

During execution of the calibration process, the controller 14 stores, in the non-volatile memory 16, the second trimming signal TCO(ITC) when it is determined by the determination circuit JC that the potential of the first relay terminal CIN0 is equal to the potential of the second relay terminal CIN1. Then, upon the subsequent resumption of power supply, the controller 14 sets the capacitance of the first circuit unit 10A of the capacitance circuit CAP10 using the second trimming signal TCO(ITC) stored in the memory 16.

As a result, through this calibration it is possible to cancel out the parasitic capacitance outside of the IC chip 100 and set the capacitance of the capacitance circuit CAP10 to an intermediate level between the capacitance prior to melting of the dielectric of the sensor capacitor 50 and the capacitance after the dielectric has melted. Thus, it is possible to determine accurately whether the dielectric filling the space between the electrodes of the sensor capacitor 50 has melted.

In the capacitance detection operation, the determination circuit JC outputs the L level detection signal COUT and the L level flag signal COUT2 if the dielectric between the electrodes of the sensor capacitor 50 that is externally connected has not melted. If the dielectric has melted to some extent and the capacitances of the sensor capacitor 50 and the capacitance circuit CAP10 are substantially equal, the determination circuit JC outputs the L level detection signal COUT and the H level flag signal COUT2. If all of the dielectric has melted, the determination circuit JC outputs the H level detection signal COUT and the L level flag signal COUT2.

Thus, according to the capacitance sensor circuit 15 of the present embodiment, information indicating whether or not the dielectric of the externally connected sensor capacitor 50 has melted, or in other words, information as to whether the capacitance of the sensor capacitor 50 has changed (COUT) is attained. Additionally, through the capacitance sensor circuit 15, information indicating whether the sensor capacitor 50 and the capacitance circuit CAP10 have substantially the same capacitance (COUT2) is attained.

When charging the sensor capacitor 50, the current consumption for the charge operation is greater compared to when the capacitance of the sensor capacitor 50 is low. Additionally, if the charging of the parasitic capacitance outside of the sensor capacitor 50 and the IC chip 100 is fast, then there is a risk that the power source voltage generated by the power source circuit 12 is reduced, causing an operation defect.

To address this issue, the capacitance sensor circuit 15 of the present embodiment provides the additional capacitor CX connected in series to the sensor capacitor 50 between the electrode pad P3 connecting one electrode W1 of the sensor capacitor 50 having a relatively high capacitance and the input terminal CIN0M2 of the switching circuit SW.

The determination circuit JC supplies, to the additional capacitor CX, a charging current transmitted from the relay terminal CIN0 thereof and supplies, to the capacitance circuit CAP20, the charging current transmitted from the relay terminal CIN1 during charging periods. As a result, the capacitance circuit CAP20 is charged and the additional capacitor CX and the sensor capacitor 50 connected in series via the electrode pad P3 are charged. Even if the capacitance CAP1 of the sensor capacitor 50 is high, by setting the capacitance CAP2 of the additional capacitor CX connected in series thereto to be low, it is possible to reduce the combined capacitance CAPT.

Also, the capacitance sensor circuit 15 executes a test mode operation for internally verifying whether the capacitance detection operation and the calibration operation were performed normally, and a capacitance determination mode operation for determining the capacitance of the transistor NM110-0 in the capacitance circuit CAP30.

First, the test mode operation will be described. In the test mode, the controller 14 supplies the H level test mode signal TEST to the switching circuit SW as well as supplying the L level leak test signal ILT to the determination circuit JC. Also, the controller 14 supplies the H level or L level enable signal EN to the capacitance circuit CAP30. Additionally, the controller 14 supplies the L level switching signal OPT2 to the switching circuit SW and the capacitance circuits CAP10, CAP20, and CAP30.

Also, during the test mode, the controller 14 supplies the L level second capacitance value selection signals TS<j:0> to the capacitance circuit CAP30.

The switching circuit SW connects the capacitance connection terminal CIN of the capacitance circuit CAP30 to the relay terminal CIN0 of the determination circuit JC, and connects the capacitance connection terminal CIN of the capacitance circuit CAP20 to the relay terminal CIN1 of the determination circuit JC. Additionally, the switching circuit SW supplies the H level test signal ITEST2 to the capacitance circuit CAP10, supplies the L level inverted test signal ITESTB2 to the capacitance circuit CAP20, and supplies the L level signal CIN0TP to the capacitance circuit CAP30.

By receiving the L level inverted test signal ITESTB2, the selection signals ITX<0> to ITX<n> of the capacitance circuit CAP20 are in the same phase as the selection signals ITC<0> to ITC<n>. Also, the selection signals ITM<0> to ITM<m> are the AND of the control signal ICAL for controlling the calibration operation and the margin trimming signals TM<m:0> (i.e., the selection signals TM<0> to TM<m>).

Additionally, by receiving the L level signal CIN0TP, the selection signals ITP<k:0> (i.e., the selection signals ITP<0> to ITP<k>) of the capacitance circuit CAP30 shown in FIG. 10 are in the same phase as the capacitance value selection signals TP<k:0> (i.e., the selection signals TP<0> to TP<k>).

Also, the NMOSs 100-0 to 100-j of the capacitance circuit CAP30 turn OFF upon the gates thereof receiving the L level second capacitance value selection signals TS<j:0>. As a result, none of the transistors NM110-0 to 110-j function as capacitors.

Here, if the capacitance circuit CAP30 receives the H level enable signal EN, the capacitance value selection signals TP<k:0> considering the parasitic capacitance outside of the IC chip 100, and margin trimming signals TM<m:0> for setting the capacitance of the capacitance circuit CAP30 to half of the difference between the capacitance prior to melting of the dielectric of the sensor capacitor 50 and the capacitance after the melting of the dielectric, then because the enable signal EN is at the H level and the switching signal OPT2 is at the L level, the ITMs<m:0> and the TMs<m:0> of FIG. 10 are at the same phase. If the capacitance of the capacitors CP50-0 to 50-m shown in FIG. 10 is set to be double the capacitance of the capacitors CP30-0 to 30-m shown in FIG. 9, the capacitors CP50-0 to 50-m are set to a capacitance corresponding to the difference between the capacitance prior to melting of the dielectric of the sensor capacitor 50 and the capacitance after melting of the dielectric.

If the aforementioned calibration is executed by the calibration circuit CAL, and the trimming signals TCO<n:0> are set such that the capacitance of the capacitance circuit CAP20 is equal to the capacitance of the capacitance circuit CAP30 in this state, the controller 14 supplies the data of the TCO<n:0> at this time as the TC<n:0> to the calibration circuit CAL. Additionally, the controller 14 supplies the H level sensor enable signal CSREN and the L level calibration enable signal CALEN to the calibration circuit CAL. In this case, the calibration enable signal CALEN is at the L level, and thus, the control signal ICAL is also at the L level and every ITM<m:0> of FIG. 9 is also at the L level. None of the capacitors CAP30-0 to 30-m function as capacitors, and thus, the capacitance of the capacitor CAP20 is set to a value resulting from subtracting, from the capacitance of the capacitance circuit CAP30, the capacitance corresponding to half of the difference between the capacitance prior to melting of the dielectric of the sensor capacitor 50 and the capacitance after melting of the dielectric.

Additionally, when the controller 14 supplies the L level enable signal EN to the capacitance circuit CAP30, every ITM<m:0> of FIG. 10 is at the L level and none of the capacitors 50-0 to 50-m function as capacitors. Thus, the capacitance of the capacitance circuit CAP30 is set to a value resulting from subtracting, from the capacitance of the capacitance circuit CAP20, a capacitance corresponding to half of the difference between the capacitance prior to melting of the dielectric of the sensor capacitor 50 and the capacitance after melting of the dielectric.

In other words, as a result of the H level enable signal EN, the L level switching signal OPT2, and the H level control signal ICAL, it is possible to verify the operation of the capacitance sensor circuit 15 in a state where the capacitance of the capacitance circuit CAP20 is reduced from the capacitance of the capacitance circuit CAP30 by a capacitance value corresponding to half of the difference between the capacitance prior to melting of the dielectric of the sensor capacitor 50 and the capacitance after melting of the dielectric.

Also, as a result of the L level enable signal EN, the L level switching signal OPT2, and the L level control signal ICAL, it is possible to verify the operation of the capacitance sensor circuit 15 in a state where the capacitance of the capacitance circuit CAP30 is reduced from the capacitance of the capacitance circuit CAP20 by a capacitance value corresponding to half of the difference between the capacitance prior to melting of the dielectric of the sensor capacitor 50 and the capacitance after melting of the dielectric.

In this manner, according to the capacitance sensor circuit 15 of the present embodiment, it is possible to verify whether the calibration operation and the detection operation were performed normally in a state where the sensor capacitor 50 to be subject to detection is not externally connected to the IC chip 100, such as in the wafer stage of the IC chip 100.

Next, the operation of the capacitance determination mode will be explained. In the capacitance determination mode, assuming a similar connective state to the test mode (i.e., the capacitance connection terminal CIN of the capacitance circuit CAP30 is connected to the relay terminal CIN0 of the determination circuit JC, and the capacitance connection terminal CIN of the capacitance circuit CAP20 is connected to the relay terminal CIN1 of the determination circuit JC), calibration is performed by changing the signal level of the second capacitance value selection signals TS<j:0>, thereby determining the capacitance values of the transistors NM110-0 to 110-j.

If, for example, TS<0> is at the H level among the second capacitance value selection signals TS<j:0>, every TS<j:1> (i.e., TS<1> to TS<j>) is at the L level, all of the first capacitance value selection signals TP<k:0> are at the L level, and all of the margin trimming signals TM<m:0> are at the L level, then among the transistors in the capacitance circuit 30, only the NMOSs 100-0 and 110-0 are ON, and the other transistors (i.e., NM80-0 to 80-k, NM90-0 to 90-m, NM100-1 to 100-j, NM110-1 to 110-j) are all OFF. Thus, the capacitance of the NMOS 110-0 is the capacitance of the capacitance circuit CAP30.

If calibration is performed in this state, a selection signal ITC<n:0> that would cause the capacitance of the capacitance circuit CAP30 to be equal to the capacitance of the capacitance circuit CAP20 is supplied from the calibration circuit CAL to the capacitance circuit CAP20. It is possible to determine the capacitance value of the capacitance circuit CAP30, or in other words, the capacitance value of the transistor NM110-0 on the basis of the value of each bit of the selection signals ITC<n:0> and the capacitance values of the corresponding capacitors CP20-0 to 20-n.

The controller 14 controls the rewrite voltage of the memory 16 on the basis of the value of each bit of the selection signals ITC<n:0> attained through calibration. The transistor NM110-0 is a MOS transistor (MOS capacitor) having the same structure and formed on the same chip as the memory 16 shown in FIG. 3, and thus, it is possible to control the rewrite voltage according to the capacitance of the film thickness of the memory 16.

As described above, according to the capacitance sensor circuit 15 of the present embodiment, by determining the capacitance value of the transistor NM110-0, it is possible to simulate determination of the capacitance of the film thickness of the memory 16. Thus, according to the capacitance sensor circuit 15 of the present embodiment, it is possible to suitably control the rewrite voltage of the memory 16 according to the capacitance of the film thickness (capacitance determined by the film thickness of the gate insulating film of the memory 16). This has the effect of improving the reliability and yield of the non-volatile memory.

Embodiment 2

Next, Embodiment 2 of the present invention will be explained. The capacitance sensor circuit of the present embodiment differs from the capacitance sensor circuit 15 of Embodiment 1 in terms of the configuration of the third capacitance circuit 30. The memory 16 of the present embodiment is constituted of capacitance elements other than NMOS transistors (e.g., PMOS capacitors or DMOS capacitors).

Figure 12:
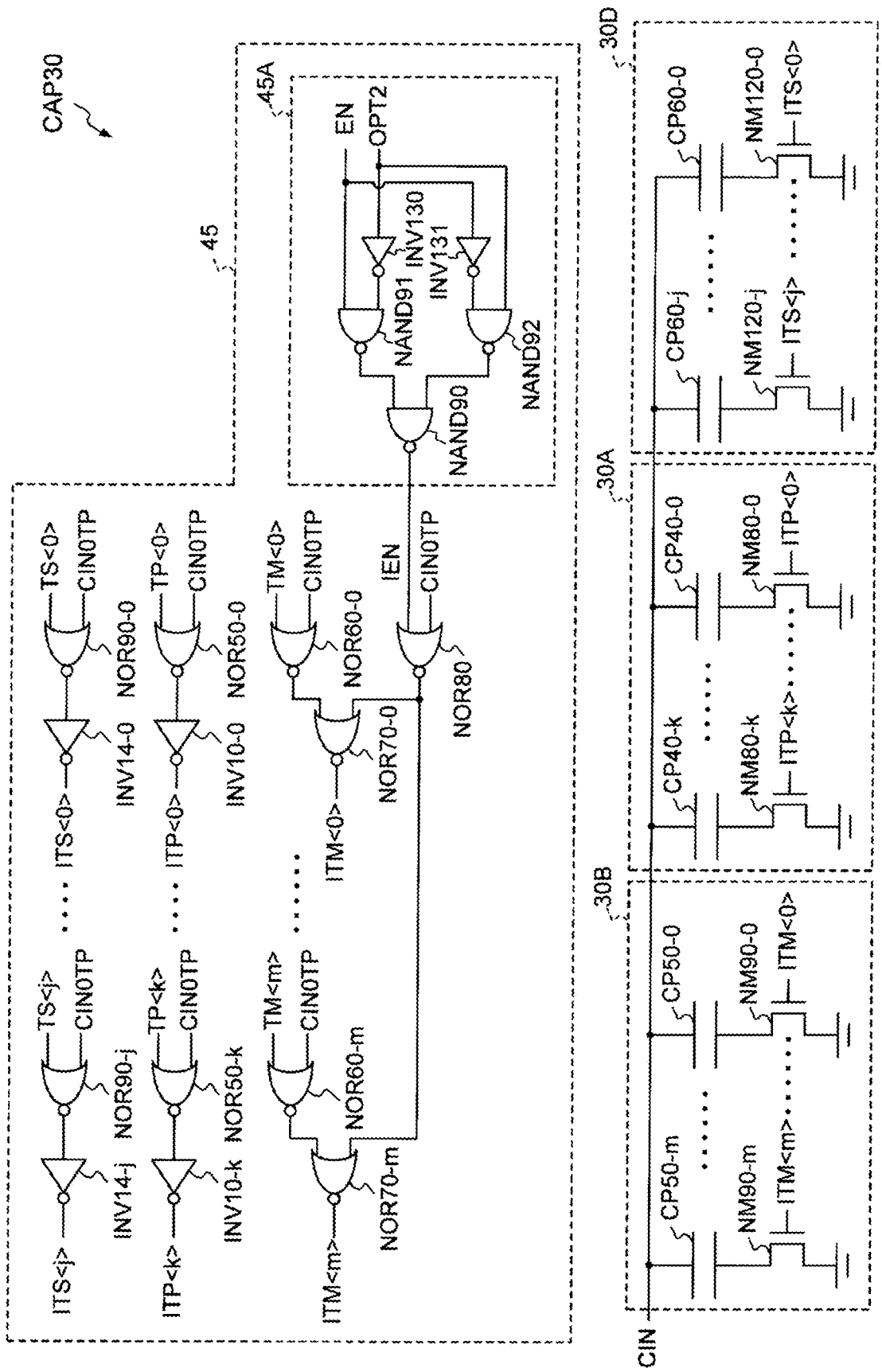
FIG. 12 is a circuit diagram showing a configuration of a capacitance circuit CAP30 according to Embodiment 2.

FIG. 12 is a circuit diagram showing a configuration of the capacitance circuit CAP30 according to the present embodiment. The capacitance circuit CAP30 has a first circuit unit 30A, a second circuit unit 30B, a third circuit unit 30D, and a signal generating circuit 45.

The third circuit unit 30D includes j+1 capacitors CP60-0 to 60-j and j+1 N-channel MOSFET transistors NM120-0 to 120-j. The capacitors CP60-0 to CP60-j each have one terminal connected to the capacitance connection terminal CIN via a common line. Similarly, the other terminals of the capacitors CP60-0 to 60-j are respectively connected to the drains of the transistors NM120-0 to 120-j. The sources of the transistors NM120-0 to 120-j are grounded. The transistors NM120-0 to 120-j respectively have gates to which the selection signals ITS<0> to ITS<j> are respectively supplied.

The third circuit unit 30D is a circuit block forming a determination capacitor used for determining the capacitance of the film thickness of the memory 16 shown in FIG. 4. The capacitors CP60-0 to 60-j of the third circuit unit 30D are constituted of the same capacitance elements (same chip, same material) as the memory 16, and it is possible to simulate determination of the capacitance of the film thickness of the memory 16 by determining the capacitance values of the capacitors CP60-0 to 60-j.

The third circuit unit 30D includes j+1 capacitors CP60-0 to 60-j and j+1 N-channel MOSFET transistors NM120-0 to 120-j. The capacitors CP60-0 to CP60-j each have one terminal connected to the capacitance connection terminal CIN via a common line. Similarly, the other terminals of the capacitors CP60-0 to 60-j are respectively connected to the drains of the transistors NM120-0 to 120-j. The sources of the transistors NM120-0 to 120-j are grounded. The transistors NM120-0 to 120-j respectively have gates to which the selection signals ITS<0> to ITS<j> are respectively supplied.

The third circuit unit 30D is a circuit block used for simulating determination of the capacitance of the film thickness of the memory 16 shown in FIG. 4. The capacitors CP60-0 to 60-j of the third circuit unit 30D are constituted of capacitance elements having the same structure as the memory 16 and being on the same chip as the memory 16. Thus, by determining the capacitance values of the capacitors CP60-0 to 60-j, it is possible to simulate determination of the capacitance of the film thickness of the memory 16.

Next, the operation of the capacitance sensor circuit 15 will be explained. The capacitance sensor circuit 15 of the present embodiment performs operations in the capacitance determination mode for determining the capacitance values of the capacitors CP60-0 to 60-j for suitably controlling the rewrite voltage of the memory 16 according to the capacitance of the film thickness thereof. In the capacitance determination mode, assuming a similar connective state to the test mode (i.e., the capacitance connection terminal CIN of the capacitance circuit CAP30 is connected to the relay terminal CIN0 of the determination circuit JC, and the capacitance connection terminal CIN of the capacitance circuit CAP20 is connected to the relay terminal CIN1 of the determination circuit JC), calibration is performed by changing the signal level of the second capacitance value selection signals TS<j:0>, thereby determining the capacitance values of the capacitors CP60-0 to 60-j.

If, for example, TS<0> is at the H level among the second capacitance value selection signals TS<j:0>, every TS<j:1> (i.e., TS<1> to TS<j>) is at the L level, all of the first capacitance value selection signals TP<k:0> are at the L level, and all of the margin trimming signals TM<m:0> are at the L level, then among the transistors in the capacitance circuit 30, only the NMOS 120-0 is ON, and the other transistors are all OFF. Thus, the capacitance of the capacitor 60-0 is the capacitance of the capacitance circuit CAP30.

If calibration is performed in this state, a selection signal ITC<n:0> that would cause the capacitance of the capacitance circuit CAP30 to be equal to the capacitance of the capacitance circuit CAP20 is supplied from the calibration circuit CAL to the capacitance circuit CAP20. It is possible to determine the capacitance value of the capacitance circuit CAP30, or in other words, the capacitance value of the capacitor CP60-0 on the basis of the value of each bit of the selection signals ITC<n:0> and the capacitance values of the corresponding capacitors CP20-0 to 20-n.

The controller 14 controls the rewrite voltage of the memory 16 on the basis of the value of each bit of the selection signals ITC<n:0> attained through calibration. The capacitor CP60-0 is constituted of a capacitance element having the same structure and formed on the same chip as the memory 16 shown in FIG. 4, and thus, it is possible to control the rewrite voltage according to the capacitance of the film thickness of the memory 16.

As described above, according to the capacitance sensor circuit 15 of the present embodiment, by determining the capacitance value of the capacitor 60-0, it is possible to simulate determination of the capacitance of the film thickness of the memory 16. Thus, according to the capacitance sensor circuit 15 of the present embodiment, it is possible to suitably control the rewrite voltage of the memory 16 according to the capacitance of the film thickness thereof. This has the effect of improving the reliability and yield of the non-volatile memory.

The present invention is not limited to the embodiments above. In Embodiment 1, for example, the capacitors constituting the third circuit unit 30C were NMOS capacitors, but the configuration is not limited thereto, and the capacitors could be other capacitance elements such as PMOS capacitors or DMOS capacitors. In this case, the NM110-0 to 110-j may be constituted of capacitance elements having the same structure as the capacitance elements constituting the memory 16.

Also, in Embodiment 1, an example was described in which the transistors NM110-0 to 110-j are selectively connected to the capacitance connection terminals CIN by the transistors NM100-0 to 100-j turning ON/OFF, but the configuration is not limited thereto, and a configuration may be adopted in which connection to the capacitance connection terminals CIN is made via other elements such as PMOS transistors and DMOS transistors.

Also, in Embodiment 1, an example was described in which one of the transistors NM110-0 to 110-j is connected to the capacitance connection terminal CIN, but the configuration is not limited thereto, and a configuration may be adopted in which a plurality of NMOS capacitors simultaneously connect to the capacitance connection terminal CIN.

In Embodiment 2, an example was described in which, during the operation of the capacitance determination mode, the capacitance value of the capacitors CP60-0 to 60-j is measured. However, a configuration may be adopted in which a plurality of MOS capacitors of different types are provided, and the respective capacitance values thereof are determined, thereby enabling control of the rewrite voltages of a plurality of different types of non-volatile memories.

In Embodiment 2, an example was described in which one end of each of the capacitors constituting the first circuit unit and the second circuit unit of the first and second capacitance circuits and the first to third circuit units of the third capacitance circuit is set in a grounded state or a non-grounded state via an NMOS transistor. However, the configuration is not limited thereto, and a configuration may be adopted in which another element such as a PMOS or a DMOS is set to a grounded state or a non-grounded state via another element.

Also, in Embodiment 2, an example was described in which one end of each of the capacitors constituting the circuit units of the first to third capacitance circuits is set in a grounded state or a non-grounded state via individual NMOS transistors. However, the configuration is not limited thereto, and a configuration may be adopted in which the one ends of the respective plurality of capacitors are simultaneously set to a grounded state or a non-grounded state via one NMOS transistor.

In Embodiment 2, an example was described in which, during the operation of the capacitance determination mode, the capacitance value of capacitor CP60-0 is measured. However, a configuration may be adopted in which a plurality of capacitors of different types are provided, and the respective capacitance values thereof are determined, thereby enabling control of the rewrite voltages of a plurality of different types of non-volatile memories.

Also, in the embodiments, an example was described in which, during the operation of the capacitance determination mode, the signal levels of all of the first capacitance value selection signals TP<k:0> and margin trimming signals TM<m:0> are set to the L level, but a configuration may be adopted in which the first circuit unit and the second circuit unit are controlled using an EN signal or an OPT signal.

Also, in the embodiments, an example was described in which the operation results of the capacitance determination mode are used to control the rewrite voltage of the memory 16, but the voltage of another memory or circuit may be controlled.

What is claimed is:

1. A semiconductor device, comprising:
   a semiconductor memory constituted of a capacitance element;
   a control unit that is configured to control a rewrite voltage for the semiconductor memory;
   a reference capacitance unit including a plurality of capacitors, each of which has a reference capacitance, and each of which is connected between a first line and a line of a prescribed potential via a switch element;
   a determination capacitance unit, one end of which is connected to a second line and another end of which is grounded, the determination capacitance unit being constituted of a capacitance element having a same structure as the capacitance element constituting the semiconductor memory;
   a calibration circuit that is configured to supply, to the reference capacitance unit, a selection signal that is configured to selectively connect, on the basis of a signal level of the selection signal, any of the plurality of capacitors to between the first line and the line of the prescribed potential by controlling the switch element connected to each of the plurality of capacitors to be ON or OFF; and
   a determination circuit that is configured to charge a capacitance of the reference capacitance unit by transmitting a charge current to the first line, to charge a capacitance of the determination capacitance unit by transmitting a charge current to the second line, and to attain a comparison result by comparing a potential of the first line to a potential of the second line,
   wherein the control unit is configured to control rewriting of the semiconductor memory on the basis of a determination result of the determination circuit.

2. The semiconductor device according to claim 1, wherein the calibration circuit is configured to change the signal level of the selection signal on the basis of the determination result of the determination circuit, and
   wherein the control unit is configured to control rewriting of the semiconductor memory on the basis of the signal level of the selection signal when the potential of the first line is determined to be equal to the potential of the second line.

3. The semiconductor device according to claim 1, wherein the capacitance element constituting the semiconductor memory is a MOS transistor, and
   wherein the capacitance element constituting the determination capacitance unit is a MOS transistor that is formed on a same substrate as the capacitance element constituting the semiconductor memory, and that has a same structure as the MOS transistor constituting the capacitance elements of the semiconductor memory.

4. The semiconductor device according to claim 1, wherein the determination capacitance unit includes a plurality of capacitors that are each connected to between the second line and the line of the prescribed potential via a switch element of the determination capacitance unit, and
   wherein the control unit is configured to supply, to the determination capacitance unit, a selection signal that is configured to selectively connect, on the basis of a signal level of the selection signal supplied to the determination capacitance unit, any of the plurality of capacitors of the determination capacitance unit to between the second line and the line of the prescribed potential.

5. The semiconductor device according to claim 4,
wherein the plurality of capacitors of the determination capacitance unit are constituted of types of capacitance elements different from each other, and
wherein the control unit is configured to change the signal level of the selection signal supplied to the determination capacitance unit according to the type of the capacitance element constituting the semiconductor memory.

6. The semiconductor device according to claim 1, further comprising:
first and second electrode pads for externally connecting first and second electrodes of a sensor capacitor that is configured to undergo a change in capacitance according to an environmental change; and
a capacitor having a pair of electrodes, one electrode of which is connected to the first electrode pad,
wherein the determination circuit includes first and second relay terminals, and is configured to transmit a charge current from the first relay terminal to another electrode among the pair of electrodes of the capacitor, transmit a charge current from the second relay terminal to a first capacitance circuit, compare a potential of the first relay terminal to a potential of the second relay terminal, and detect whether a capacitance of the sensor capacitor has changed on the basis of a comparison result.

7. The semiconductor device according to claim 1,
wherein the reference capacitance unit includes a first circuit unit that is connected to the first line and that has a variable capacitance, and a second circuit unit that is connected to the first line and that has a variable capacitance,
wherein the control unit is configured to supply, to the second circuit unit, a first trimming signal that is configured to set the capacitance of the second circuit unit to a margin capacitance, and
wherein the calibration circuit is configured to execute calibration by supplying, to the first circuit unit, a second trimming signal that is configured to set the capacitance of the first circuit unit to a capacitance that changes in stages as time passes.

8. The semiconductor device according to claim 7,
wherein the control unit is configured to store, in a non-volatile memory, the second trimming signal when the potential of the first relay terminal is determined by the determination circuit to be equal to the potential of the second relay terminal during execution of the calibration, and to set the capacitance of the first circuit unit by the second trimming signal stored in the memory during a subsequent supply of power.

9. A capacitance sensor circuit that is formed on a same chip as a semiconductor memory constituted of a capacitance element, and that detects a capacitance of the capacitance element, the capacitance sensor circuit comprising:
a reference capacitance unit including a plurality of capacitors, each of which has a reference capacitance, and each of which is connected between a first line and a line of a prescribed potential via a switch element;
a determination capacitance unit, one end of which is connected to a second line and another end of which is grounded, the determination capacitance unit being constituted of a capacitance element having a same structure as the capacitance element constituting the semiconductor memory;
a calibration circuit that is configured to supply, to the reference capacitance unit, a selection signal that is configured to selectively connect, on the basis of a signal level of the selection signal, any of the plurality of capacitors to between the first line and the line of the prescribed potential by controlling the switch element connected to each of the plurality of capacitors to be ON or OFF; and
a determination circuit that is configured to charge a capacitance of the reference capacitance unit by transmitting a charge current to the first line, to charge a capacitance of the determination capacitance unit by transmitting a charge current to the second line, and to attain a comparison result by comparing a potential of the first line to a potential of the second line.

* * * * *